US008199363B2

(12) United States Patent
Chung et al.

(10) Patent No.: US 8,199,363 B2
(45) Date of Patent: Jun. 12, 2012

(54) IMAGE PROCESSING USING HYBRID LOOKUP TABLE

(75) Inventors: Woo-jun Chung, Suwon-si (KR);
Sang-youn Shin, Seoul (KR);
Choon-woo Kim, Seoul (KR);
Byong-tae Ryu, Seoul (KR); Jong-ok Lee, Incheon (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1355 days.

(21) Appl. No.: 11/782,091

(22) Filed: Jul. 24, 2007

(65) Prior Publication Data

US 2008/0117465 A1 May 22, 2008

(30) Foreign Application Priority Data

Nov. 17, 2006 (KR) .................. 10-2006-0114119

(51) Int. Cl.
*G06K 15/00* (2006.01)
*G06K 9/36* (2006.01)
*H04N 1/40* (2006.01)
(52) U.S. Cl. .............. 358/3.03; 358/3.21; 358/3.05; 382/284
(58) Field of Classification Search .......... 358/3.21, 358/3.05, 3.03; 382/284
See application file for complete search history.

(56) References Cited

U.S. PATENT DOCUMENTS

| 5,333,064 | A | 7/1994 | Seidner et al. |
| 5,598,204 | A | 1/1997 | Harrington |
| 5,982,508 | A | 11/1999 | Kashihara |
| 6,343,159 | B1 * | 1/2002 | Cuciurean-Zapan et al. 382/284 |
| 6,717,700 | B1 * | 4/2004 | Sanderson et al. ........... 358/3.21 |
| 2005/0225806 | A1 | 10/2005 | Damera-Venkata |
| 2006/0165285 | A1 | 7/2006 | Adachi |
| 2006/0215194 | A1 | 9/2006 | Gotoh et al. |
| 2006/0227382 | A1 | 10/2006 | Ng et al. |

FOREIGN PATENT DOCUMENTS

EP 0932299 7/1999

(Continued)

OTHER PUBLICATIONS

European Search Report issued Dec. 3, 2009 in EP Application No. 07118140.8.

(Continued)

*Primary Examiner* — Charlotte M Baker
*Assistant Examiner* — Justin Katzwhite
(74) *Attorney, Agent, or Firm* — Stanzione & Kim, LLP

(57) ABSTRACT

An image processing method and an image processing apparatus converts a binary image into a grayscale image by increasing the size and information quantity of the binary image. The image processing method includes generating a plurality of lookup tables having multiple gray level values assigned to a predetermined pattern of the binary image such that the gray level is retrieved from the plurality of lookup tables depending on the context of the block being processed. The binary image may be converted into the grayscale image by applying the gray value of one of the plurality of lookup tables that corresponds to the context, such as the frequency components of the binary image. With this configuration, since the size and information quantity of an image can be reduced for transmission, it is possible to prevent deterioration of image quality when the image is restored, while also printing at a higher speed.

16 Claims, 22 Drawing Sheets

FOREIGN PATENT DOCUMENTS

EP 1492328 12/2004
KR 2006-62341 6/2006

OTHER PUBLICATIONS

Murat Mesemese et al: "Look-Up Table (LUT) Method for Inverse Halftoning" IEEE Transactions on Image Processing, IEEE Service Center, Picataway, NJ, US, vol. 10, No. 10, Oct. 1, 2001, XP011025851 ISSN: 1057-7149 * p. 4 * * p. 10-p. 11 *.

Mese, Murat and Vaidyanathan, P.P, "Look-Up Table (LUT) Method for Inverse Halftoning," IEEE Transactions on IMage Processing, vol. 10, No. 10, Oct. 2001, pp. 1566-1578.

European Search Report issued Oct. 5, 2009 in EP Application No. 07118140.8.

Murat Mesemese et al: "Look-up Table (LUT) Method for Inverse Halftoning" IEEE Transactions on Image Processing, IEEE Service Center, Piscataway, NJ, US, vol. 10, No. 10, Oct. 1, 2001, XP011025851 ISSN 1057-7149 * p. 4*, * p. 10-p. 11*, *the whole document*.

European Office Action issued in European Patent Application No. 07118140.8 on Oct. 13, 2011.

* cited by examiner

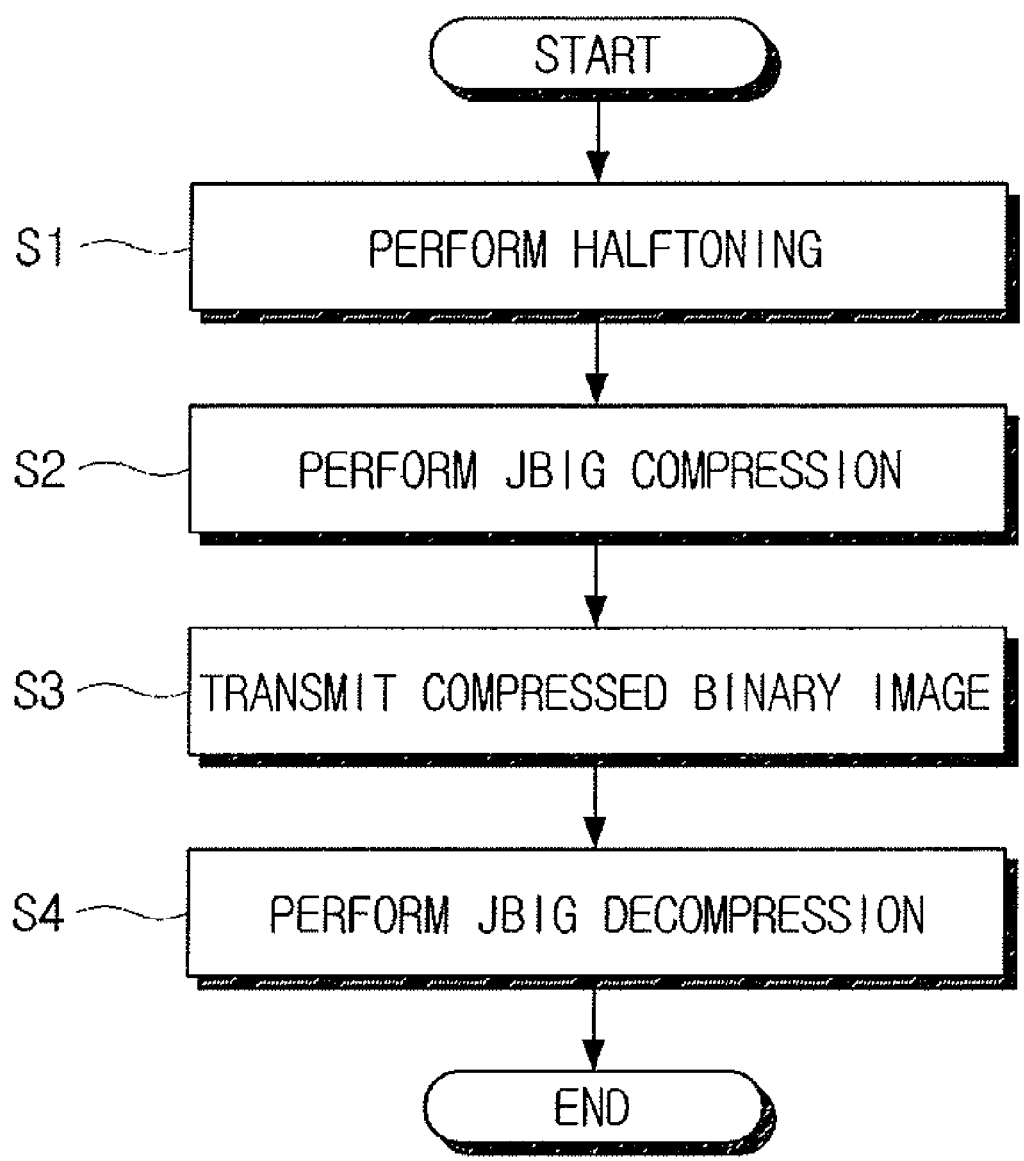

FIG. 15

IMAGE PROCESSING USING HYBRID LOOKUP TABLE

CROSS-REFERENCE TO RELATED APPLICATIONS

This application claims benefit of priority under 35 U.S.C. 119(a) from Korean Patent Application No. 2006-0114119, filed on Nov. 17, 2006 in the Korean Intellectual Property Office, the disclosure of which is incorporated herein by reference in its entirety.

BACKGROUND OF THE INVENTION

1. Field of the Invention

The present general inventive concept most closely relates to image processing, and more particularly, to an image processing method and an image processing apparatus, which convert a binary image having low resolution into a grayscale image having higher resolution.

2. Description of the Related Art

In general, performance of an image forming apparatus, such as a printer, a multifunction copier, and so on, is determined by such factors as print speed and image quality. Factors affecting the print speed include print resolution, print data transmission time from a host apparatus, such as a computer system, to the image forming apparatus, print data processing time in either or both of the host apparatus and the image forming apparatus, and printing time of a printer engine in the image forming apparatus. Historically, printing speed has been dominated by certain mechanical limitations of the printer engine. In recent years, however, with improvements to increase the speed of the printer engine, the print data transmission time and the print data processing time have dominated the overall time to print.

The print data transmission time and the print data processing time are determined by a data exchange system between the host apparatus and the image forming apparatus. For example, if a printer driver executing in the host apparatus employs a graphics device interface (GDI) system that performs color matching, image rendering, etc., print data may be compressed by a compression algorithm in the host apparatus, such as Joint Bi-level Image Expert Group (JBIG), to reduce transmission time for the data to traverse the distance from the host apparatus to the image forming apparatus. The transmitted print data are then decompressed and printed in the image forming apparatus. On the other hand, if the printer driver employs a page description language (PDL) system, the print data are transmitted as, for example, descriptors that are processed entirely in the image forming apparatus to render the image, unlike the GDI system.

FIG. 1 is a flow chart illustrating an example of a conventional process of transmitting print data from a host apparatus to an image forming apparatus. Referring to FIG. 1, at operation S1 halftoning is performed in the host apparatus on an 8-bit grayscale image having a resolution of 200×200 pixels and the grayscale image is converted into a one-bit binary image having resolution of 200×200 pixels. Next, JBIG compression is performed on the resultant binary image at operation S2 and the compressed binary image is transmitted from the host apparatus to an image forming apparatus at operation S3. At operation S4, JBIG decompression is performed on the binary image transmitted to the image forming apparatus. In this case, a high-capacity page memory is required to store the 200×200 one-bit image. Additionally, a large quantity of data must be transmitted since the compressed binary image also has a large quantity of data. If a page memory has the capacity to store an image transmitted from the host apparatus to the image forming apparatus, that is, there is a large quantity of transmission data, a long time is required to transmit the data to fill the page memory, prior to which no printing is performed.

FIGS. 2A and 2B are flow charts illustrating other examples of conventional processes to print data from a host apparatus to an image forming apparatus. FIG. 2A illustrates a case where the amount of data of an input image (hereinafter also referred to as "information quantity") is reduced. In this example, operations S11 to S14 are similar to the operations S1 to S4 in the example of FIG. 1. The example of FIG. 2A additionally includes operation S15, where the 200×200 one-bit binary image decompressed in operation S14 is converted into a 200×200 8-bit grayscale image. Consequently, operation S15 increases the information quantity.

FIG. 2B illustrates a case where the size of an input image is reduced. In the example of FIG. 2B, operations S21 to S24 are similar to operations S11 to S14 in the example of FIG. 2A. The example of FIG. 2B additionally includes operation S20 where the size of an input image is reduced from 200×200 pixels to 100×100 pixels. The process of FIG. 2B further includes operation S25 to increase the spatial resolution of the 100×100 one-bit binary image, decompressed in operation S24, to produce a 200×200 one-bit binary image. The operation S25 expands the size of the image using an interpolation method or the like.

Using the above-described processes to reduce the information quantity or the size of the image prior to the transmission of the print data may result in a shortened transmission time. Specifically, print data to fill a page memory reduced to ⅛ its size otherwise can be transmitted in the example of FIG. 2A and print data to fill a page memory reduced to ¼ its size otherwise can be transmitted in the example of FIG. 2B. Subsequent to print data transmission, the data to render the image in a desired size and resolution can be obtained by increasing the information quantity or the number of pixels in the recovered image.

FIG. 3 is a flow chart illustrating a conventional resolution increasing method using a lookup table. As illustrated in FIG. 3, at operation S31 a binary image is input, and an image process at operation S32 is performed by accessing a lookup table (not illustrated) to retrieve image data corresponding to an input block of the input binary image. When the image process is performed on all input blocks constituting the binary image at operation S33, the resolution increasing method is terminated.

In such a conventional method, the image process is performed using one predetermined lookup table irrespective of characteristics of the input binary image. In the case where the lookup table contains mean values of pixels obtained from a representative training image, artifacts, such as blurring, may occur in a resultant image pattern after the image processing of a specific input image.

SUMMARY OF THE INVENTION

The present general inventive concept provides an image processing method and an image processing apparatus to increase the resolution of an image using a lookup table containing values for different image characteristics.

Additionally, the present general inventive concept provides an image processing method and an image processing apparatus to prevent processing artifacts, such as blurring or a mosaic pattern, by applying a value from the lookup table corresponding to characteristics of an image.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing an image processing method of converting a binary image into a grayscale image comprising generating a plurality of lookup tables having gray level values assigned to a predetermined pattern of the binary image such that the plurality of lookup tables corresponds to frequency components of the binary image, and converting the binary image into the grayscale image by retrieving the gray level value from one of the plurality of lookup tables that corresponds to one of the frequency components of the binary image.

The plurality of lookup tables may comprise an image lookup table corresponding to an image having a low frequency component and a text lookup table corresponding to an image having a high frequency component, and the converting the binary image into the grayscale image may comprise retrieving the gray level value from one of the image lookup table or the text lookup table according to a text ratio of the binary image.

At least one of the image lookup table and the text lookup table may be determined using a pattern existing in the binary image and a mean value of a plurality of gray level values corresponding to the pattern in the grayscale image.

The text ratio may be a ratio of a frequency at which a pattern to be processed occurs in an overall training image to a frequency at which the pattern to be processed occurs in a training image having the high frequency component.

The plurality of lookup tables may further comprise an overall lookup table corresponding to the overall training image, and the converting the binary image into the grayscale image may comprise retrieving the gray level value from the image lookup table or the text lookup table if a text ratio of the pattern to be processed falls within a first range and a difference between values of the image lookup table and the text lookup table is larger than a first threshold value.

The plurality of lookup tables may further comprise an overall lookup table corresponding to the overall training image, and the converting the binary image into the grayscale image may comprise retrieving the gray level value from the image lookup table or the text lookup table if a text ratio of the pattern to be processed is out of a first range and frequency at which the pattern to be processed occurs in the overall training image falls within a second range.

The converting the binary image into the grayscale image may comprise retrieving the gray level value from the text lookup table if the number of blocks adjacent to a block having the pattern to be processed and having the text ratio larger than a second threshold value is larger than a third threshold value.

The generating the plurality of lookup tables may comprise determining an optimized template using a genetic algorithm.

The foregoing and/or other aspects and utilities of the present general inventive concept are also achieved by providing an image processing apparatus to convert a binary image into a grayscale image, comprising a storing part that stores a plurality of lookup tables having gray level values assigned to a predetermined pattern of the binary image such that the plurality of lookup tables corresponds to frequency components of the binary image, and a converting part that converts the binary image into the gray image by retrieving the gray level value from one of the plurality of lookup tables that corresponds to one of the frequency components of the binary image.

The foregoing and/or other aspects and utilities of the present general inventive concept are also achieved by providing a method to convert a binary image into a multi-bit pixel image, comprising storing in a memory table a first multi-bit pixel value and a second multi-bit pixel value each addressed by a like bit pattern formed from states of binary image pixels, and assigning to a pixel in the multi-bit pixel image one of the first multi-bit pixel value and the second multi-bit pixel value addressed by the like bit pattern corresponding to the states of the binary image pixels in an image block of the binary image containing a binary pixel corresponding to the pixel in the multi-bit pixel image, the first multi-bit pixel value being assigned to the pixel when the image block is in a first image context and the second multi-bit pixel value being assigned to the pixel when the image block is in a second image context.

The foregoing and/or other aspects and utilities of the present general inventive concept are also achieved by providing a method to convert a binary image obtained from an image having a first resolution to a multi-bit pixel image having a second resolution, comprising forming a hybrid lookup table having a plurality of storage locations respectively addressable by a plurality of bit patterns, at least two of the storage locations being addressed by a like one of the bit patterns, storing in each of the storage locations of the hybrid lookup table a multi-bit pixel value obtained from a multi-bit training image at a pixel location corresponding to a binary pixel in an image block of a binary training image, the multi-bit training image having the second resolution, the bit pattern to address each of the storage locations being formed from states of a plurality of binary pixels in the image block of the binary training image, the at least two storage locations storing a first multi-bit pixel value and a second multi-bit pixel value, and assigning to a pixel in the multi-bit pixel image the first multi-bit pixel value when the image block in the binary image having pixel states corresponding to the like bit pattern is in a first image context and assigning the second multi-bit pixel value when the image block in the binary image having the pixel states corresponding to the like bit pattern is in a second image context.

The foregoing and/or other aspects and utilities of the present general inventive concept are also achieved by providing an apparatus to convert a binary image into a multi-bit pixel image, comprising a storing part to store a first multi-bit pixel value and a second multi-bit pixel value each addressed by a like bit pattern formed from states of binary image pixels, and a converting part to assign to a pixel in the multi-bit pixel image one of the first multi-bit pixel value and the second multi-bit pixel value addressed by the like bit pattern corresponding to the states of the binary image pixels in an image block of the binary image containing a binary pixel corresponding to the pixel in the multi-bit pixel image, the converting part to assign the first multi-bit pixel value to the pixel when the image block is in a first image context and to assign the second multi-bit pixel value to the pixel when the image block is in a second image context.

BRIEF DESCRIPTION OF THE DRAWINGS

The above and/or other aspects and utilities of the present general inventive concept will become apparent and more readily appreciated from the following description of the exemplary embodiments, taken in conjunction with the accompanying drawings, in which:

FIG. 1 is a flow chart illustrating an example of a conventional process of transmitting print data from a host apparatus to an image forming apparatus;

FIG. 15 is a view illustrating eight adjacent blocks PN around a block P to be processed;

DETAILED DESCRIPTION OF THE PREFERRED EMBODIMENTS

Figure 2A:
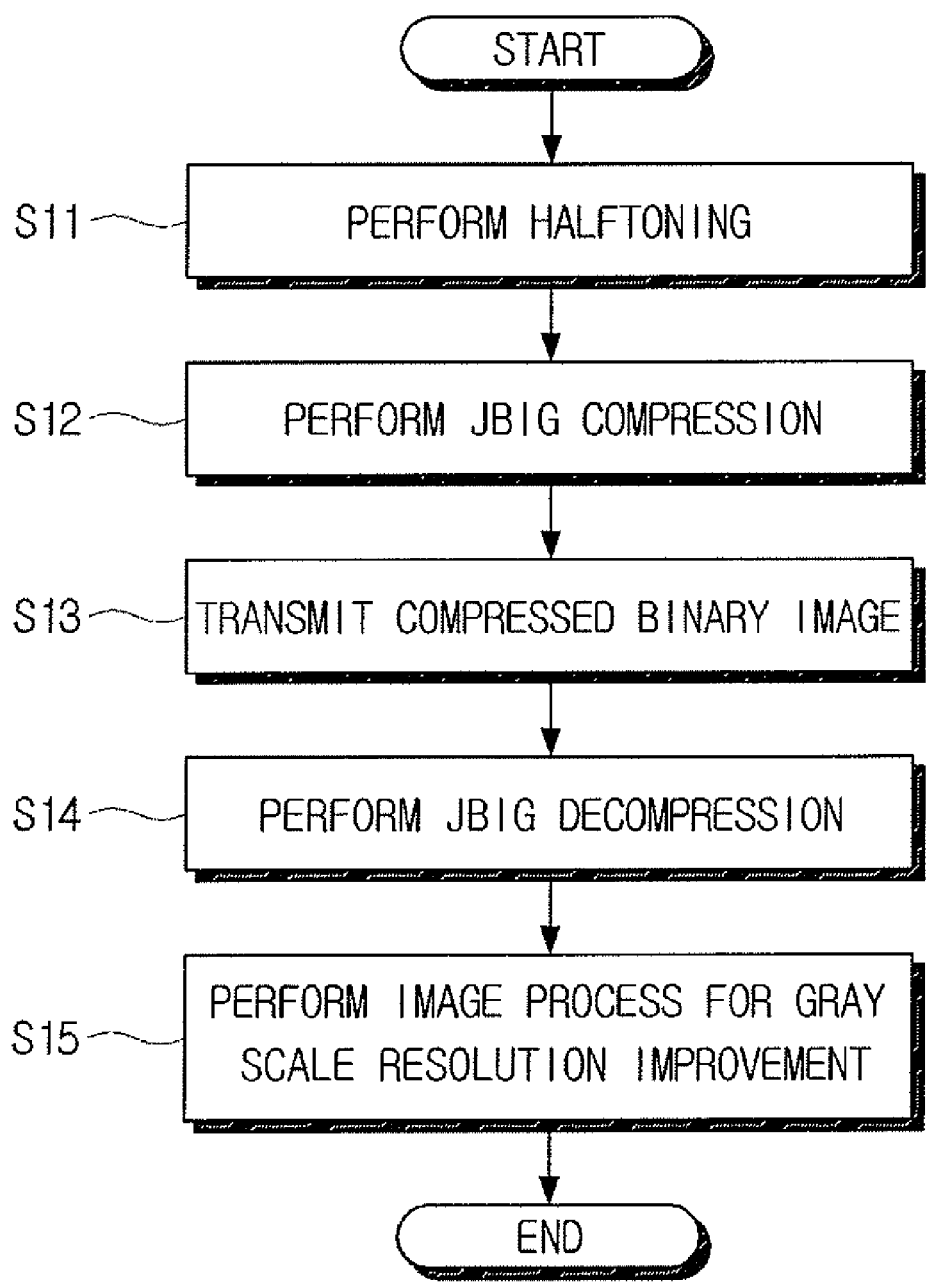
FIG. 2A is a flow chart illustrating another example of a conventional process of transmitting print data from a host apparatus to an image forming apparatus.
Figure 2B:
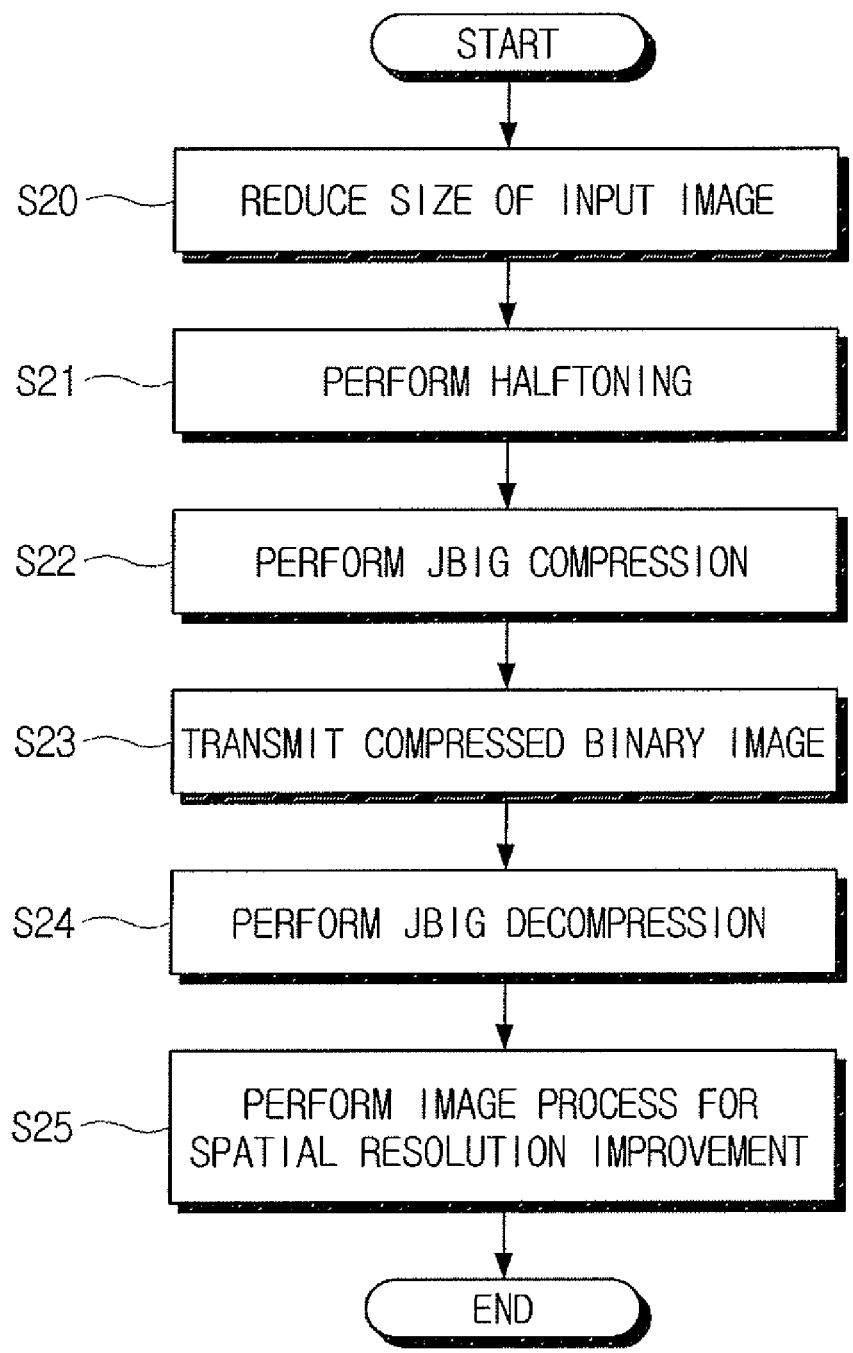
FIG. 2B is a flow chart illustrating yet another example of a conventional process of transmitting print data from a host apparatus to an image forming apparatus.
Figure 3:
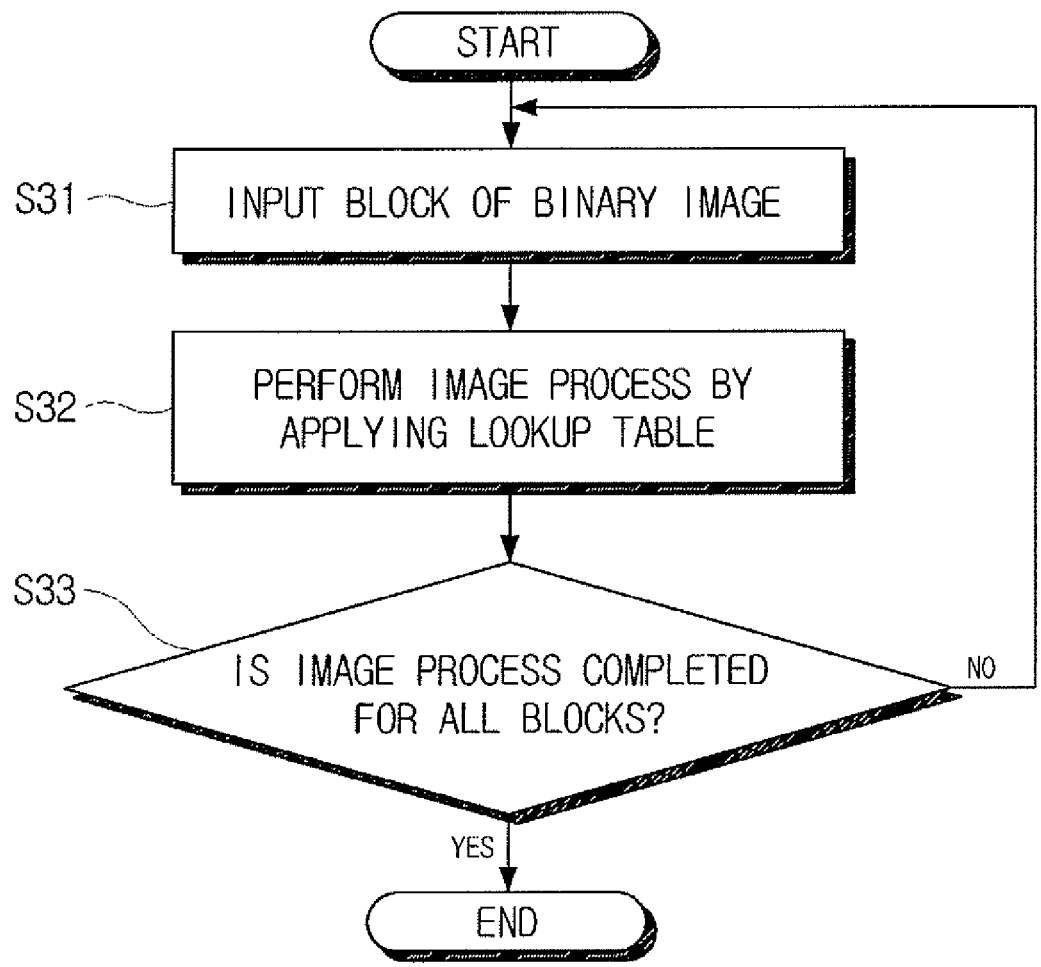
FIG. 3 is a flow chart illustrating a conventional resolution increasing method using a lookup table.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

In an image processing method according to an exemplary embodiment of the present general inventive concept, a binary image is converted into a multi-bit pixel image by increasing the size and information quantity of the binary image. The exemplary image processing method of this embodiment comprises operations to generate a memory table encompassing a plurality of lookup tables containing multi-bit pixel values addressed by bit patterns corresponding to predetermined pixel patterns of the binary image. Such a memory table is hereinafter referred to as a "hybrid lookup table," or hybrid LUT, and may contain multiple multi-bit pixel values for a given bit pattern so that a particular multi-bit image pixel value, such as a gray level value, can be assigned to a pixel in accordance with an "image context" of the pixel. As used herein, an "image context" is a region in the image that can be characterized by one or more defining features. An image context may be a block of pixels having features defined by, for example, the spatial frequency content thereof, although other characteristics such as brightness, pixilated boundaries, color gradients, etc., may be used to define image contexts without departing from the spirit and intended scope of the present general inventive concept. The hybrid lookup table may be used to convert the binary image into, for example, a grayscale image by retrieving associated gray level values from the one of the plurality of lookup tables that corresponds to the image context of each pixel processed, such as, for example, the frequency content of the region of the binary image in the neighborhood of the pixel. In the exemplary embodiments described below, the multi-bit pixel values are gray level values of a grayscale image, although the present general inventive concept is not limited thereto.

Figure 4:
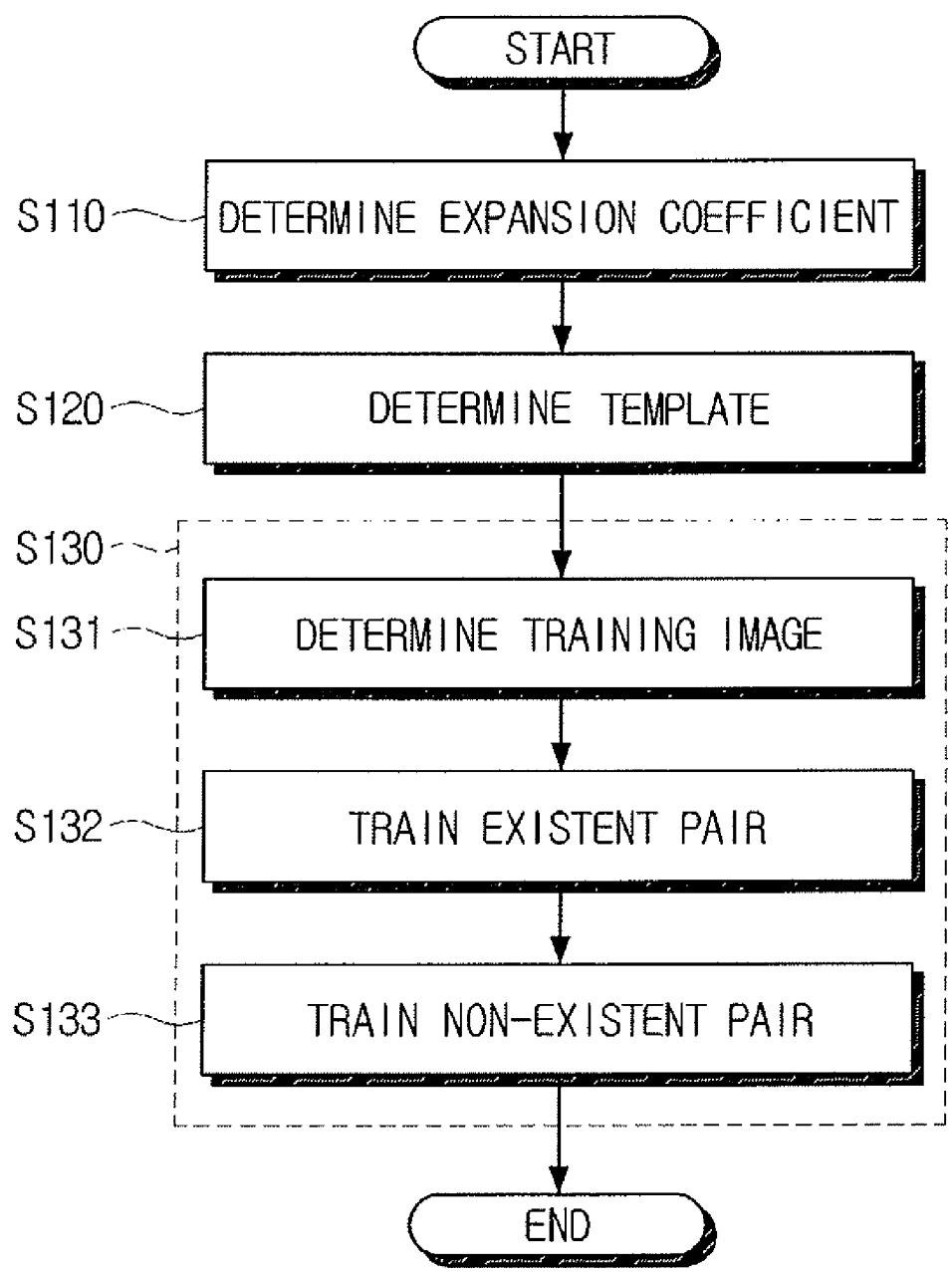
FIG. 4 is a flow chart illustrating a process of generating a hybrid lookup table according to an exemplary embodiment of the general inventive concept.

FIG. 4 is a flow chart illustrating a process of generating the hybrid lookup table according to an exemplary embodiment of the present general inventive concept. As illustrated in FIG. 4, specifically, the operation of generating the hybrid lookup table in the illustrated exemplary embodiment comprises operation S110 of determining an expansion coefficient, operation S120 of determining a template, and operation S130 of performing training.

The expansion coefficient, as used herein, will refer to a multiplicative value corresponding to the increase in resolution from the input binary image to the final grayscale image. For example, if the expansion coefficient is two (2), a 600× 600 dpi binary input image will be scaled to a resultant 1200× 1200 dpi grayscale image. For purposes of demonstration only in the exemplary embodiment, the expansion coefficient will be assigned a value of two (2) without being limited thereto.

In operation S120, of FIG. 4, a search is conducted to find an "optimized" template, which, for a particular block size spanning a block of pixels in a binary image, establishes which pixel positions are used to determine the grayscale value to be assigned to the pixel being processed. As with many optimizing search procedures, a measure of fitness allows solutions to be graded and, in certain procedures such as the genetic algorithm described below, allows "better" solutions to be used as a base, or "parent," from which the search is continued.

Figure 5:
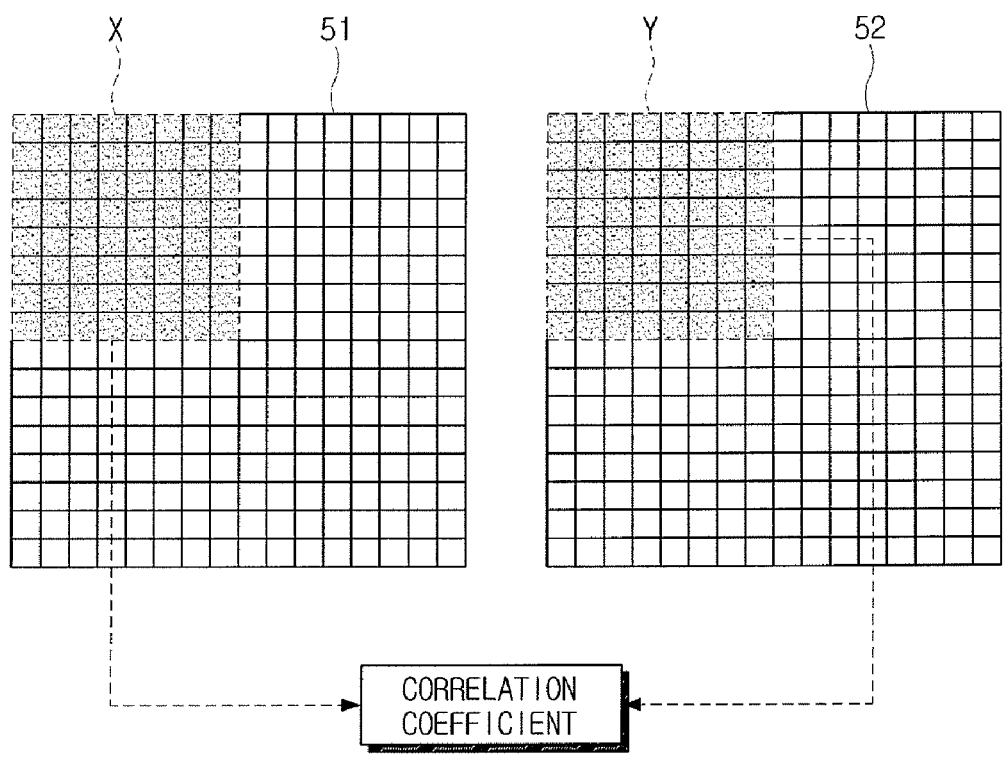
FIG. 5 is a view illustrating a process of calculating a cost associated with the calculation of a fitness value.

FIG. 5 is a view illustrating a configuration of pixels to demonstrate a calculation of an exemplary cost-based fitness value. As is illustrated in FIG. 5, an input grayscale image 51 and a restored image 52 are divided into block units of a certain block size of pixels. A correlation coefficient $\rho_{xy}$ may be calculated from a pair of corresponding blocks X and Y of the known input grayscale image 51 and the restored image 52, respectively, according to the following equation 1.

$$\rho_{xy} = \frac{\sigma_{xy}}{\sigma_x \sigma_y} \qquad \text{[Equation 1]}$$

In equation 1, $\sigma_{xy}$ is a covariance of X and Y, and $\sigma_x$ and $\sigma_y$ represent standard deviations of X and Y, respectively.

Next, correlation coefficients are calculated from all blocks, and then a cost, which may be an average of the correlation coefficients, is calculated, such as by the following equation 2.

$$\text{Cost} = \frac{1}{L}\sum_{i=0}^{L-1}\rho_{xy} \qquad \text{[Equation 2]}$$

In equation 2, L is the number of blocks in the image. The cost function of equation 2 evaluates how close a restored image is to the original image, and therefore is suitable as a fitness measure. It is to be understood, however, that other fitness measures may be used in conjunction with the present general inventive concept without departing from the spirit and intended scope thereof.

Next, operation S120 of determining a template will be described. In the operation S120 of determining a template, an optimized template may be determined using an evolutionary search process, such as a genetic algorithm, that obtains positions of pixels constituting the template. It is to be understood, however, that other procedures for determining templates may be used in conjunction with the present general inventive concept without deviating from the spirit and intended scope thereof. The template may be used to evaluate respective states of the binary pixels that are members of the template in the neighborhood of the pixel being processed, where the states of the member pixels define the bit pattern to address into the hybrid LUT. Ultimately, the pixel being processed is to visually appear to be nearly, or, ideally, exactly the same gray level as the image that was halftoned to produce the binary image on which the template is applied.

Figure 6:
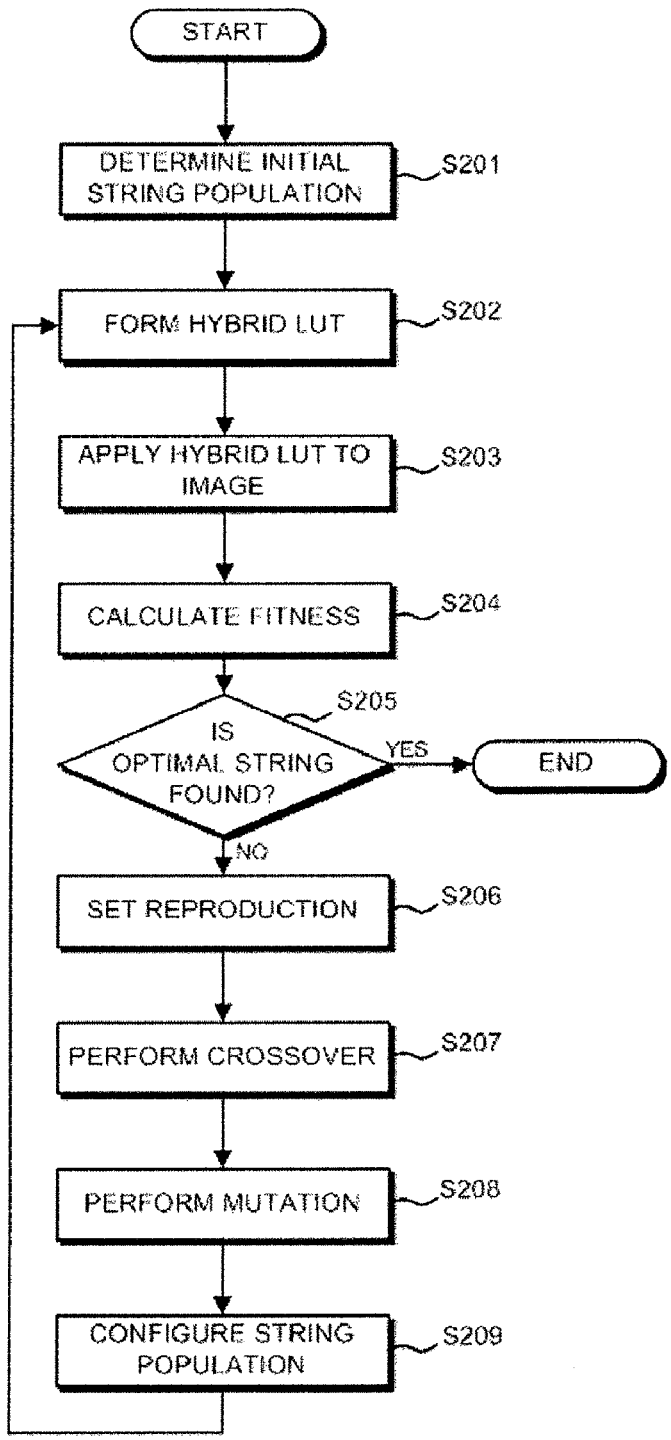
FIG. 6 is a flow chart illustrating a process of calculating optimized weights using a genetic algorithm.

FIG. 6 is a flow chart illustrating an exemplary process of calculating optimized weighting by member pixels of the template using a genetic algorithm. The exemplary genetic algorithm of FIG. 6 may be realized as processor instructions executed on a processor to search for an optimized template. In certain embodiments of the present general inventive concept, the genetic algorithm is executed on processing equipment separate from the image forming apparatus.

Referring to FIG. 6, an initial population of strings is determined at operation S201. The initial population may be a randomly selected set of strings having the bits thereof representing whether a corresponding location in the template is a member pixel thereof.

Figure 7:
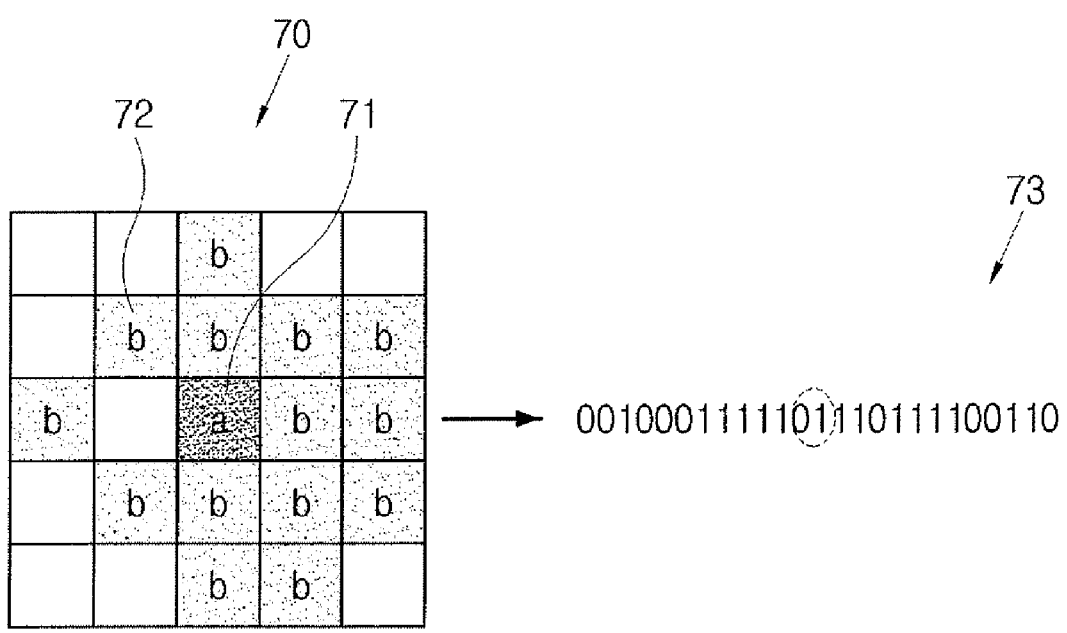
FIG. 7 is a view illustrating an initial string.

FIG. 7 is a view illustrating an exemplary string. The exemplary string forms a weighting scheme in that it indicates the member pixels of the template that will be used to set the gray level of a pixel being processed. As illustrated in FIG. 7, the exemplary string 73 has a value of "0" corresponding to a pixel position in an image processing block 70 that is not a member of the template and a value of "1" corresponding to a pixel position in the image processing block 70 that is a member of the template. In FIG. 7, the exemplary template is configured to process a center pixel 71 of the image processing block 70 indicated by "a" in accordance with the binary state of the pixels at positions 72 in the block 70 indicated by "b." It is to be understood that other template configurations may be used in conjunction with the present general inventive concept without departing from the spirit and intended scope thereof. For example, the template may be optimized to have the pixel to be processed, i.e., the pixel at position "a," in a position other than at the center position of the image process block.

Referring once again to FIG. 6, once the initial strings have been selected, the process transitions to operation S202, in which a hybrid LUT is determined. The hybrid LUT, ultimately, is populated to associate a gray level value with one or more corresponding patterns of bit states of member binary pixels of the template. Additionally, as discussed above, the gray level value that is assigned may be a function of the image context of the pixel being processed. For example, in certain embodiments of the present general inventive concept, the gray level value is set in accordance with an image context defined by spatial frequency components of the image in the neighborhood of the pixel being processed. Thus, in these embodiments, the hybrid LUT may contain more than one gray value for an encountered pattern. This may also be achieved, as will be described below, by a separate LUT for each image context, such as for each of a predetermined number of spatial frequency bands.

Once the template has been optimized, the LUT may contain the results of the training, which is described below. Thus, the template optimization may be achieved in conjunction with, or concurrently with the training operation, or, alternatively, the hybrid LUT may be populated during template optimization with images other than the training images. Alternatively still, known gray values visually associated with halftone patterns may populate the LUT. However, during the template optimization, gray level values for the chosen image characteristic, such as individual spatial frequency bands, should be included in the LUT so that the template can be evaluated for fitness.

Once the hybrid LUT has been created, the template is applied to an image at operation S203 using the lookup table determined in the operation S202.

Returning to FIG. 6, a fitness value is calculated for each string in the population at operation S204, such as through the cost function of equation 2. In certain embodiments of the present general inventive concept, the strings may be ordered as to their fitness and it may then be determined at operation S205 whether the most fit string meets the optimal fitness criteria, such as the cost function of equation 2 exceeding a threshold value. If it has been ascertained that a string meets the optimal fitness criteria, the hybrid LUT determining process of FIG. 6 may terminate. If, however, no string is found to be optimal at operation S205, the breeding procedures of the genetic algorithm are executed at operations S206 to S208. The breeding procedures in the present exemplary embodiment include reproduction (operation S206), crossover (operation S207) and mutation (operation S208).

First, the reproduction operation (S206) is performed to establish which strings will serve as parents for the next generation of solutions. The parent strings are paired according to a reproduction probability determined from the fitness value calculated for each string using the following equation 3.

$$P(i) = \frac{F(i)}{\sum_{j=1}^{n} F(j)} \qquad \text{[Equation 3]}$$

In equation 3, P(i) and F(i) represent a reproduction probability and a fitness value of an i-th string, respectively, and n is the total number of strings in the population. In certain embodiments of the present general inventive concept, each string will be paired with a number of other strings proportional to its reproduction probability for purposes of breeding a pair of children strings. In this manner, the most fit strings are used the most number of times in producing the next generation of strings.

Figure 8A:
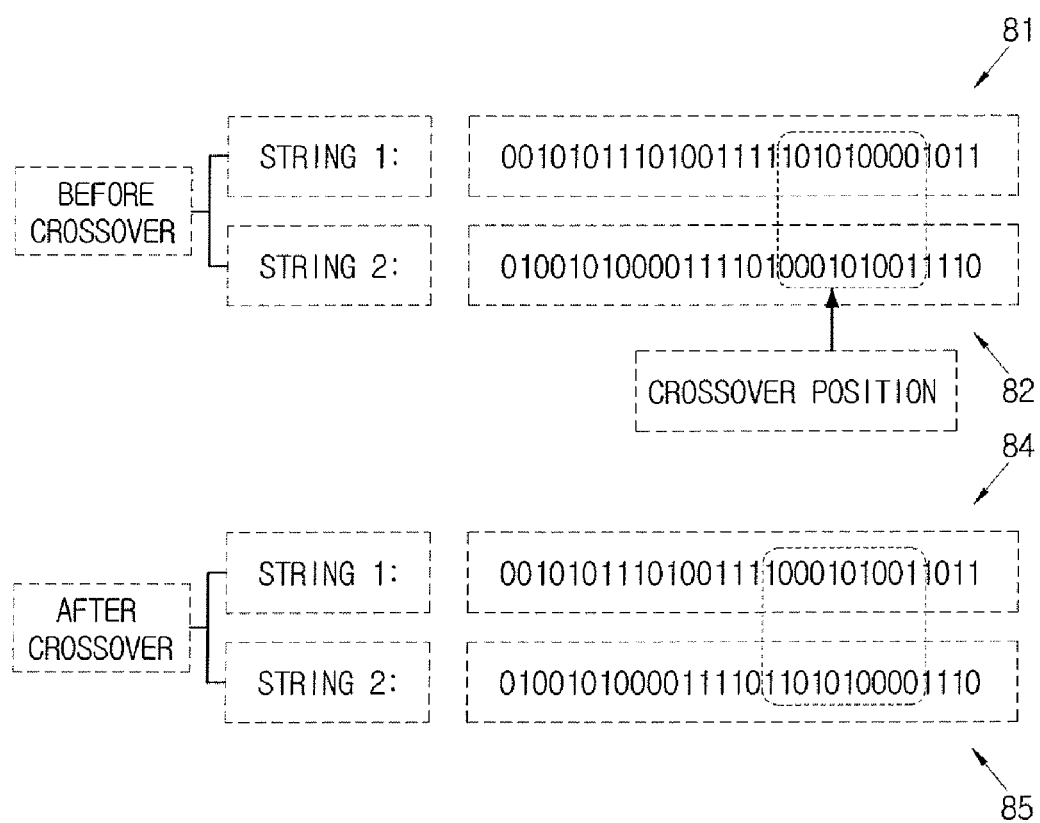
FIGS. 8A and 8B are views illustrating a process of crossover and mutation, respectively, of a genetic algorithm.
Figure 8B:
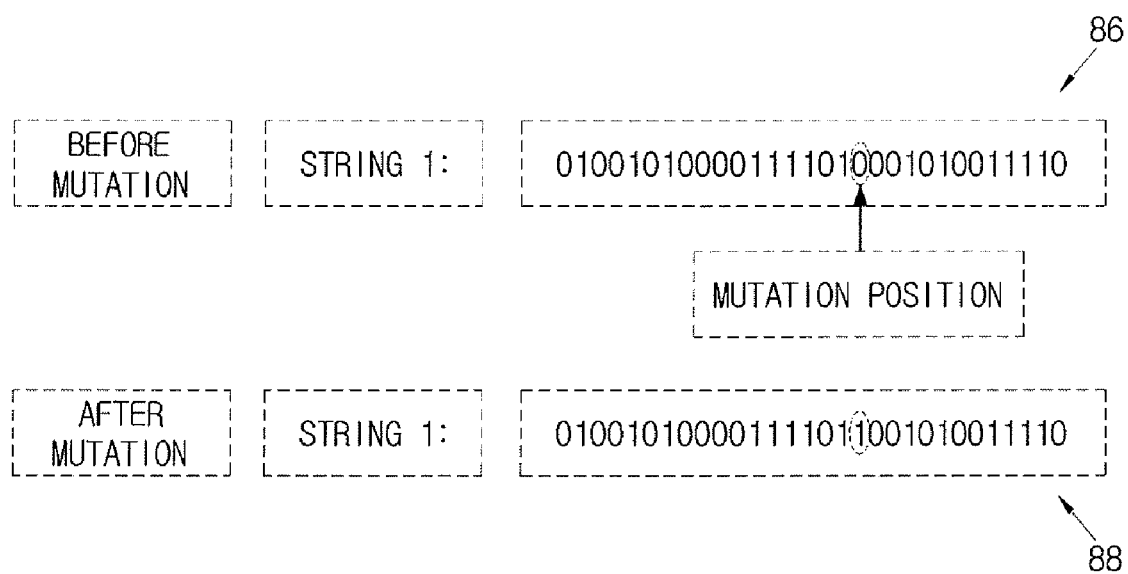

FIGS. 8A and 8B are views illustrating the crossover operation (S207) and the mutation operation (S208), respectively. First, referring to FIG. 8A, two strings 81 and 82 are selected for the crossover operation (S207). A predetermined number of bits of the two strings 81 and 82 are interchanged around a predetermined crossover position (see reference numerals 84 and 85 in FIG. 8A) to create a pair of children strings that are added to the population of strings.

Subsequently, referring to FIG. 8B, a predetermined number of strings, such as that representatively illustrated as string 86, are selected for the mutation operation (S208) and a position of the mutation operation (S208) is selected. The mutation operation (S208) inverts a binary value of the bit in the string 86 corresponding to the position of the mutation operation (see reference numeral 88 in FIG. 8B). The mutation operation (S208) prevents the genetic algorithm from converging on local extrema to thereby fail in finding a global solution matching the fitness criteria.

At operation S209 of FIG. 6, the string population is evaluated to determine which solution shall serve as the template in the next iteration of the process. Since a string's fitness as a template is determined after the template has been applied to an image, certain embodiments of the present general inventive concept select a child string from the previously most fit string as the template. More than one string from a generation may be tested for its fitness as a template prior to breeding a subsequent generation. Additionally, in operation S209, strings that have a reproduction probability less than a predetermined threshold may be removed from the population so as to minimize breeding operations that would be unlikely to produce children strings closer to the optimum. Once the new population has been established, the process of FIG. 6 is reiterated at the hybrid LUT forming operation S202.

Figure 9:
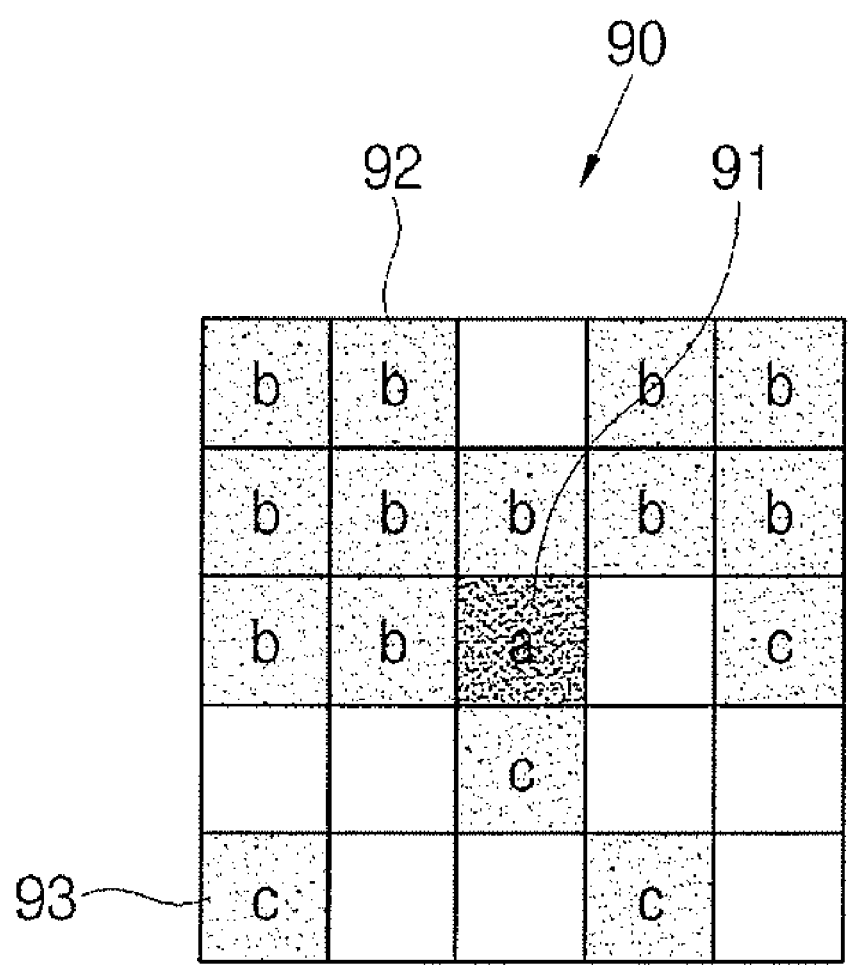
FIG. 9 is a view illustrating positions of pixels constituting a template optimized by a genetic algorithm.

FIG. 9 is a view illustrating positions of pixels constituting an exemplary template optimized by the genetic algorithm. In FIG. 9, it is assumed that the image processing block size of the template 90 is 5×5 and the number of member pixels used in the template 90 is 16. In FIG. 9, pixels 91, 92 and 93 indicated by "a", "b" and "c," respectively, constitute the optimized template 90. In this case, the pixel 91 indicated by "a" is a pixel to be processed. The pixels 92 indicated by "b" may be located by way of the optimization to have more effect on the result of the hybrid resolution improving process of the present general inventive concept, to be discussed below, while the pixels 93 indicated by "c" may be located to have less effect on the result of the hybrid resolution improving process. For example, when a principal distance-based error diffusion process is used to convert the original grayscale image into the binary image, the template may be constructed such that pixels at positions from which the majority of errors were diffused into the pixel to be processed are included in the template at positions therein having a greater influence on the resulting restored image.

Having obtained the optimized template, the embodiment of the present general inventive concept referred to hereinafter as the "hybrid resolution improving process" is trained as indicated in FIG. 4 at operation S130. Briefly, the training operation uses a halftoned image for which corresponding gray levels are known and populates the hybrid LUT with the associated gray levels for each pattern encountered in the training image. Thus, as indicated above, the template optimization may be performed concurrently with the training, where each candidate template is tested against the training image or images, and when the optimized template has been found, the hybrid LUT would then already be populated and trained.

As illustrated in FIG. 4, the operation S130 of performing the training comprises sub operation S131 of determining a training image, sub operation S132 of populating the hybrid LUT with the existent pairs of patterns and gray level values that exist in the training image. FIG. 4 also depicts sub operation S133 of estimating a non-existent pair for a pattern that does not exist in the training image.

In the sub operation S131 of determining the training image, the training image is selected. The selection of the training image has an effect on the result of the hybrid resolution improving process in that the image characteristics of the training image will be carried into the images processed subsequent to such training. For example, when a hybrid lookup table trained on a training image of spatially arranged pixel clusters to have significant energy in high frequency bands is applied to an image having similar frequency characteristics, the resultant image quality is improved over results obtained otherwise. Similarly, when a hybrid lookup table trained on a training image of pixels distributed to contain primarily low frequency components is applied to an image of primarily low frequency content, a higher image quality is obtained over other cases. Accordingly, certain embodiments of the present general inventive concept implement a hybrid lookup table through an optimized training image, as will be presently described.

According to certain embodiments of the present general inventive concept, the training image is an assemblage of images, each image having image blocks in various image contexts to be used in training. Additionally, the training image may have the expansion factor applied thereto such that a binary input image is expanded to a higher resolution grayscale image. For example, the training image may be formed as a pair of images each selected for its content of corresponding frequency components. In this exemplary embodiment, where the value of the expansion factor is assumed to be two (2), the training image may be constituted by a 600 dpi binary image and a 600×2=1200 dpi grayscale image, which is the lower resolution multiplied by the expansion factor. Here, the 600 dpi binary image may be generated by performing halftoning on a 600 dpi grayscale image. A halftoning method used in this exemplary embodiment may be a principal distance-based error diffusion method using visual estimation.

Figure 10:
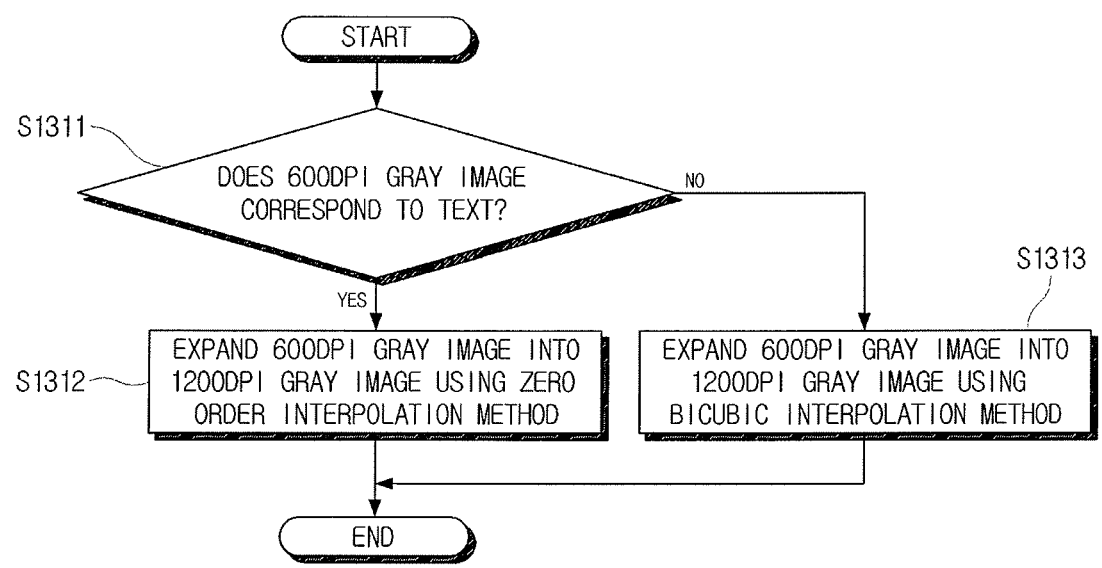
FIG. 10 is a flow chart illustrating a process of expanding a 600 dpi grayscale image into a 1200 dpi grayscale image.

In certain embodiments of the present general inventive concept, the 1200 dpi grayscale image is an interpolation of the 600 dpi grayscale image. In this exemplary embodiment, the interpolation method is chosen depending on the characteristics of the image context. FIG. 10 is a flow chart illustrating an exemplary process of expanding the 600 dpi grayscale image into the 1200 dpi grayscale image. Referring to FIG. 10, it is first determined at operation S1311 whether the 600 dpi grayscale image from which the 600 dpi binary image is obtained contains text, which is characterized by high energy content in high frequency bands. If it is determined at operation S1311 that the 600 dpi grayscale image contains text, a zero order interpolation may be applied to expand the 600 dpi grayscale image into the 1200 dpi grayscale image at operation S1312.

On the other hand, if the 600 dpi grayscale image is composed of smoothly distributed features so as to contain a majority of low frequency components, such as where the 600 dpi grayscale image does not contain text, a bicubic interpolation may be applied to expand the 600 dpi grayscale image into the 1200 dpi grayscale image at operation S1313. In certain embodiments of the present general inventive concept, the training image is formed of a first 600 dpi binary image halftoned from a first 600 dpi gray scale image containing a large percentage of text and a corresponding first 1200 dpi image interpolated from the first 600 dpi gray scale image through a zero order interpolation process, a second 600 dpi binary image halftoned from a second 600 dpi grayscale image containing primarily smooth features, and a corresponding second 1200 dpi image interpolated from the second 600 dpi grayscale image through a bicubic interpolation process. Alternatively, the training image may be a 600 dpi binary image halftoned from an image containing both high and low frequency components and a corresponding 1200 dpi grayscale image constructed to sufficiently maintain the frequency composition of the original grayscale image. The present general inventive concept may be implemented with a variety of training images without departing from the spirit and intended scope thereof. Moreover, many training schemes that can be used in conjunction with the present general inventive concept will become apparent to the skilled artisan upon review of this disclosure. The scope of the present general inventive concept is intended to encompass all such alternative training schemes.

Next, the sub operation S132 of the training process S130 will be described. In the sub operation S132, the hybrid lookup table is populated with "existent pairs" of the training image. As used herein, an "existent pair" is a bit pattern in the binary image and its corresponding gray level in the grayscale image. A bit pattern may correspond to one gray level value at one location in the training image and may correspond to another gray level value elsewhere in the training image. Certain embodiments of the present general inventive concept include consideration of these instances, as will be detailed in paragraphs that follow.

Figure 11A:
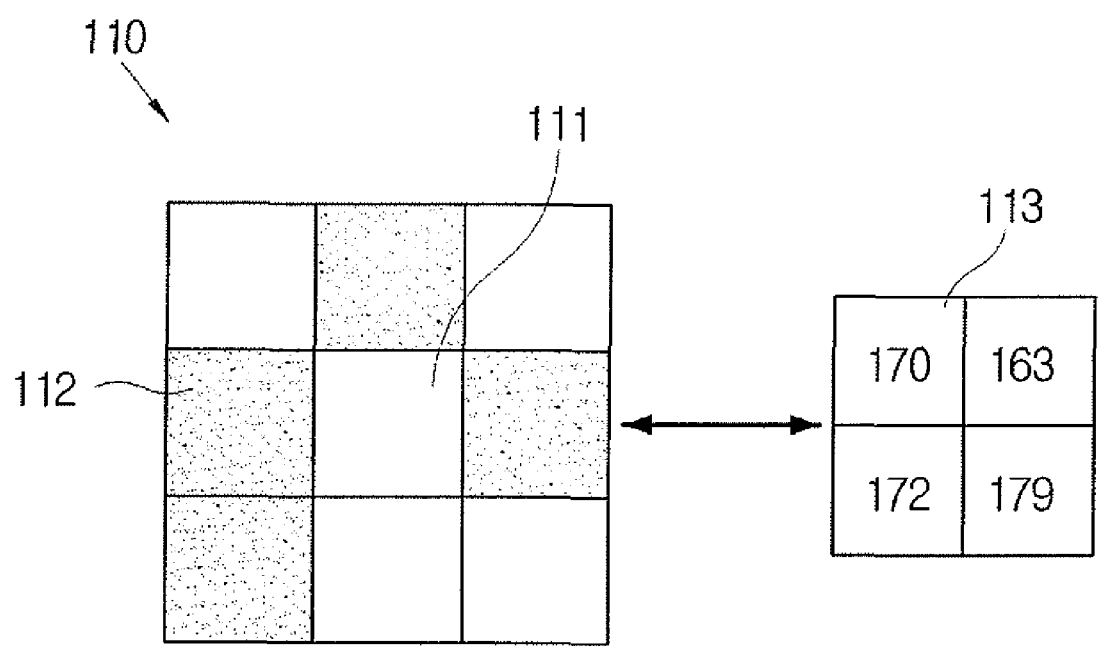
FIGS. 11A and 11B are views illustrating an existent pair existing in a training image.
Figure 11B:
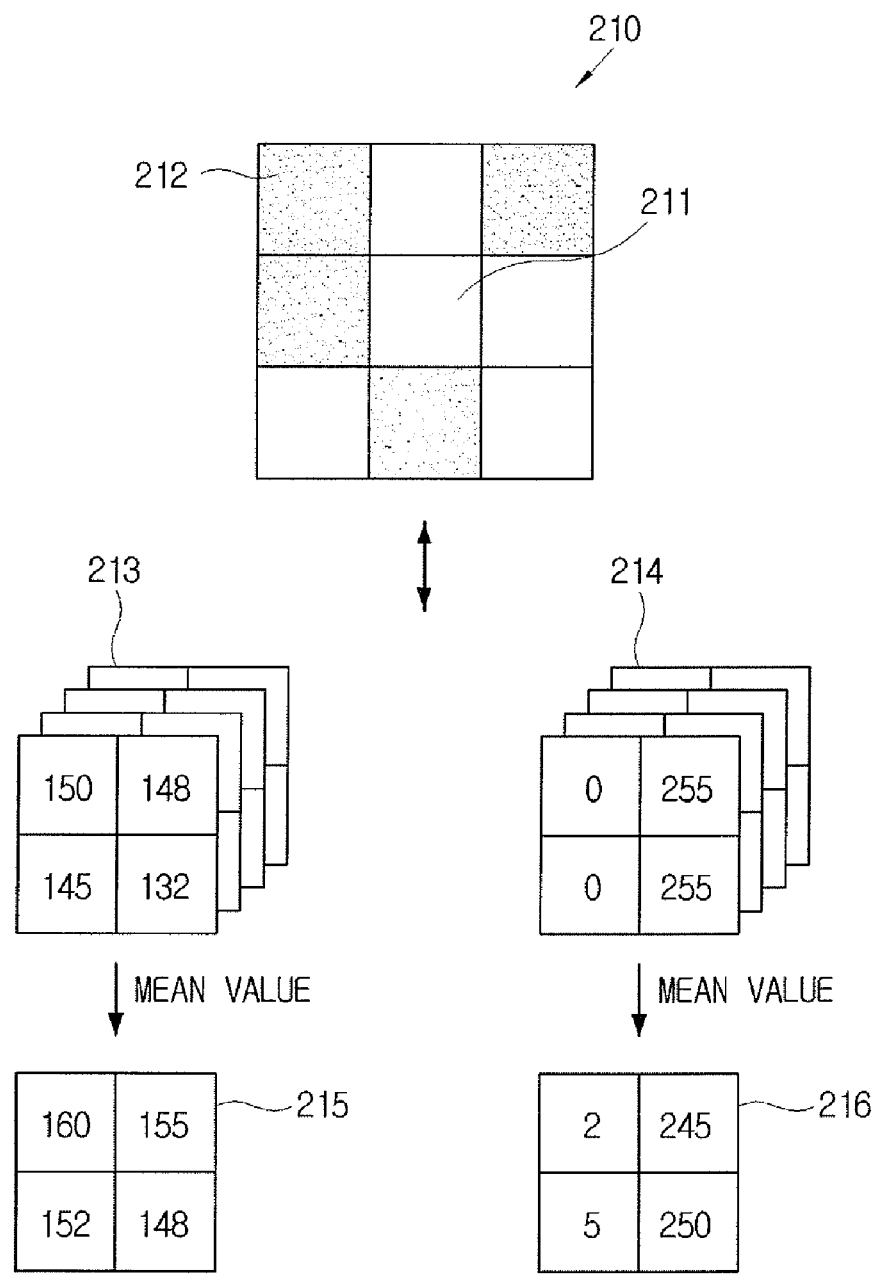

FIGS. 11A and 11B are views illustrating existent pairs of the training image. FIG. 11A depicts one existent pair, where it is assumed that, for purposes of simple illustration and not limitation, a template 110 has a block size of 3×3 pixels. In FIG. 11A, a reference numeral 111 denotes a position in the template 110 of a pixel to be processed. If a pattern 112 of member pixels of the template 110 exists in the 600 dpi binary image, there exists a corresponding gray level value 113 in the 1200 dpi grayscale image at the location of the pattern 112. The gray level value 113 in the 1200 dpi grayscale image and the corresponding pattern in the 600 dpi binary image having the pattern 112 comprise a single existent pair.

FIG. 11B depicts the case where two or more existent pairs for the same pattern of member pixels of the template 210 exists. In FIG. 11B, a reference numeral 211 denotes a position in the image processing block of a pixel to be processed, and a reference numeral 212 denotes the pattern 212 of member pixels of the template. If there are multiple gray level values assigned to a given pattern in the hybrid LUT, then a plurality of existent pairs exists. Only one gray level value from among these existent pairs can be assigned to a multi-bit pixel, so certain embodiments of the present general inventive concept assign a mean value of the gray level values to the existent pair.

However, to prevent artifacts such as blurring from occurring in, for example, an edge region of a restored image, as a consequence of using a mean gray level for all occurrences of a pattern, certain embodiments of the present general inventive concept may populate multiple lookup tables, each containing a grayscale value corresponding to a different image context. For example, embodiments of the present general inventive concept provide a hybrid LUT containing a separate gray level value for each band of frequency components in the training image. For purposes of demonstration and not limitation, the hybrid lookup table to be described in the exemplary embodiment that follows comprises an image lookup table corresponding to low frequency image contexts and a text lookup table corresponding to high frequency image contexts. Other embodiments may include an overall lookup table optimized on a generic overall training image that may include a selected distribution of frequencies to define other image contexts on which to train.

Referring to FIG. 11B, the plurality of exemplary existent pairs may be divided into existent pairs 213 corresponding to low frequency components in the training image and existent pairs 214 corresponding to high frequency components in the training image.

The image lookup table stores a mean value 215 of gray level values of the existent pairs 213 for a given pattern existing in the image containing the low frequency components, while the text lookup table stores a mean value 216 of gray level values of the existent pairs 214 for a given pattern existing in the image containing the high frequency components, even when the patterns are equivalent in both LUTs. Each LUT is accessed during normal processing, i.e., after training has been completed, by a binary number formed from states in the binary image pixels that are member pixels of the template and returns a gray level value, such as the mean gray level value of all training occurrences of the pattern in the corresponding training image, from the LUT corresponding to the image context, which in the case of the illustrative embodiment, is the spatial frequency content of the image.

In the examples described above, the plurality of existent pairs are classified by the associated low and high frequency content and the pixel patterns of the existent pairs are used to access the LUT corresponding to the sought frequency component, and the gray level of the existent pair, stored as, for example, the mean value of the gray levels, is retrieved from the image lookup table or the text lookup table.

Next, the sub operation S133 of estimating the non-existent pair will be described. In the sub operation S133 of estimating the non-existent pair, a best linear estimation, such as that disclosed in "*Look-Up Table (LUT) Method for Inverse Halftoning*," Murat Mese and P. P. Vaidyanathan, IEEE Transactions on image processing, Vol. 10, No. 10, Oct. 2001, may be used to estimate gray level values of existent pairs that do not exist in the training image.

A non-existent pair refers to a pattern of input pixels and that is not encountered in the training image during training and, as such, does not have a gray value assigned thereto. If the number of non-existent pairs in the image being processed is between 10% and 30% of the total number of image processing blocks in the image, estimated output values of the non-existent pairs are satisfactory with regard to the overall quality of the resultant image.

The following equation 4 expresses a relationship between an existent pair and a non-existent pair.

$$\begin{bmatrix} p_{0,0} & p_{0,1} & \cdots & p_{0,N-1} \\ p_{1,0} & p_{1,1} & \cdots & p_{1,N-1} \\ \vdots & \vdots & \vdots & \vdots \\ p_{M-1,0} & p_{M-1,1} & \cdots & p_{M-1,N-1} \end{bmatrix} \begin{bmatrix} x_0 \\ x_1 \\ \vdots \\ x_{N-1} \end{bmatrix} = \begin{bmatrix} b(0) \\ b(1) \\ \vdots \\ b(m-1) \end{bmatrix} \quad \text{[Equation 4]}$$
$$\phantom{xxxxxxxxxxxx} A \phantom{xxxxxxxxxxxxxxxx} x \phantom{xxxxx} b$$

In equation 4, M is the number of existent pairs and N is the number of member pixels constituting a template. The rows of the matrix A are respective bit patterns of existent pairs, and the elements of vector b are the respective gray level values corresponding to the existent pair. For example, a first row $[p_{0,0}\ p_{0,1} \cdots p_{0,N-1}]$ of the matrix A represents a first existent pattern, and b(0) represents a gray level value corresponding to the first existent pattern.

Next, when a weight vector x is determined according to the following equation 5, gray level values LUT(P) corresponding to non-existent patterns are calculated according to the following equation 6.

$$x = (A^T A)^{-1} A^T b \quad \text{[Equation 5]}$$

$$LUT(P) = \begin{cases} 0, & \text{if } y < 0 \\ 255, & \text{if } y > 255 \\ \text{round}(y), & \text{otherwise} \end{cases} \quad \text{[Equation 6]}$$

In equation 6, P represents a non-existent pattern, and y represents an estimated gray level value corresponding to the non-existent pattern. In certain embodiments of the present general inventive concept, the estimated gray level value LUT(P) is stored in the LUT under the pattern x for use in processing.

Figure 12:
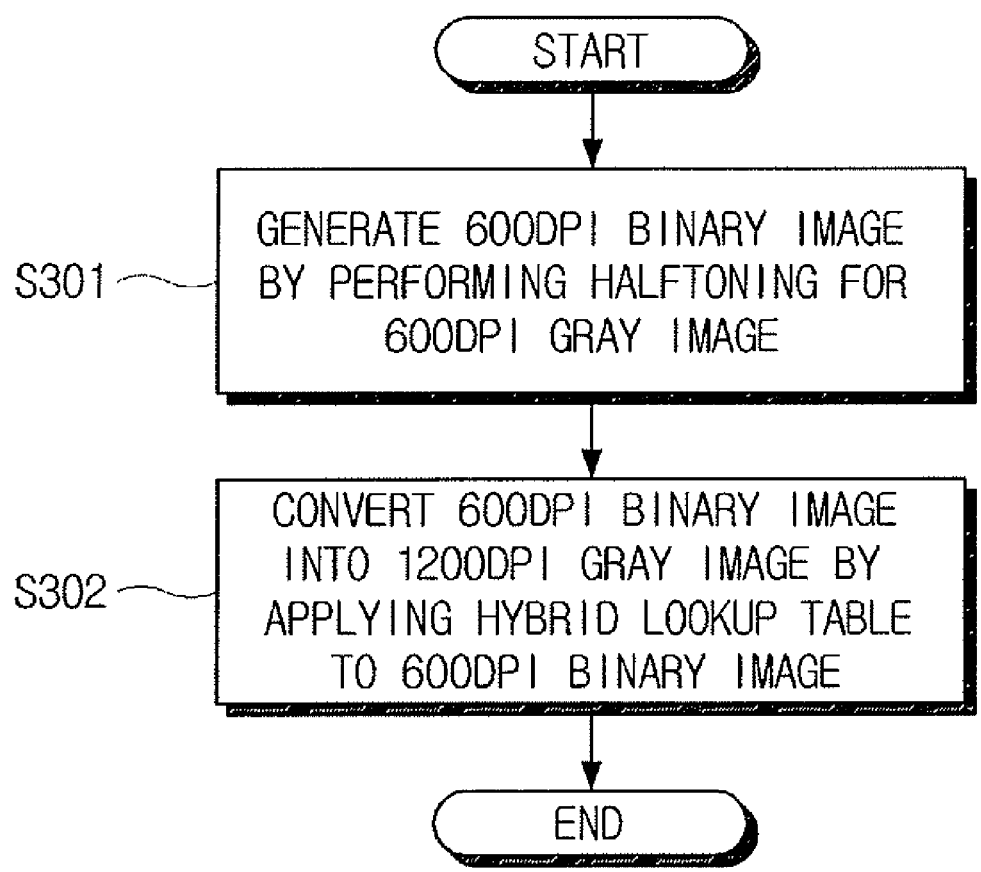
FIG. 12 is a flow chart illustrating a test process using a hybrid lookup table.

FIG. 12 is a flow chart illustrating an exemplary image processing procedure using a generated hybrid lookup table in accordance with certain embodiments of the present general inventive concept. As illustrated in FIG. 12, a 600 dpi grayscale image is input for, say, resolution doubling, and a 600 dpi binary image is generated using a halftoning method at operation S301. The halftoning method used in the present exemplary embodiment may be the same as the halftoning method used to generate the binary image in the training process. Taking the expansion coefficient to be two (2) then, at operation S302, the 600 dpi binary image generated in the operation S301 is converted into a 1200 dpi grayscale image through data stored in the hybrid lookup table generated as above.

Certain embodiments of the present general inventive concept include mechanisms to determine the image context of an input block. For example, when the image context is defined by frequency content of an image neighborhood, and the image context of data being evaluated is determined from the frequency band characterizing the region surrounding the data being evaluated, then such mechanisms may indicate which gray level value, e.g., the level from the low frequency lookup table or the level from the high frequency lookup table, should be retrieved. The exemplary embodiment described below includes such a mechanism for determining which gray level value to retrieve, but it is to be understood that other such mechanisms may be used in conjunction with the present general inventive concept without deviating from the spirit and intended scope thereof.

The hybrid lookup table of the following exemplary embodiment comprises three lookup tables: an image lookup table imageLUT trained on low spatial frequency content, a text lookup table textLUT trained on high spatial frequency content, and an overall lookup table LUT trained on mixed spatial frequency content from an overall training image, as described above.

Figure 13A:
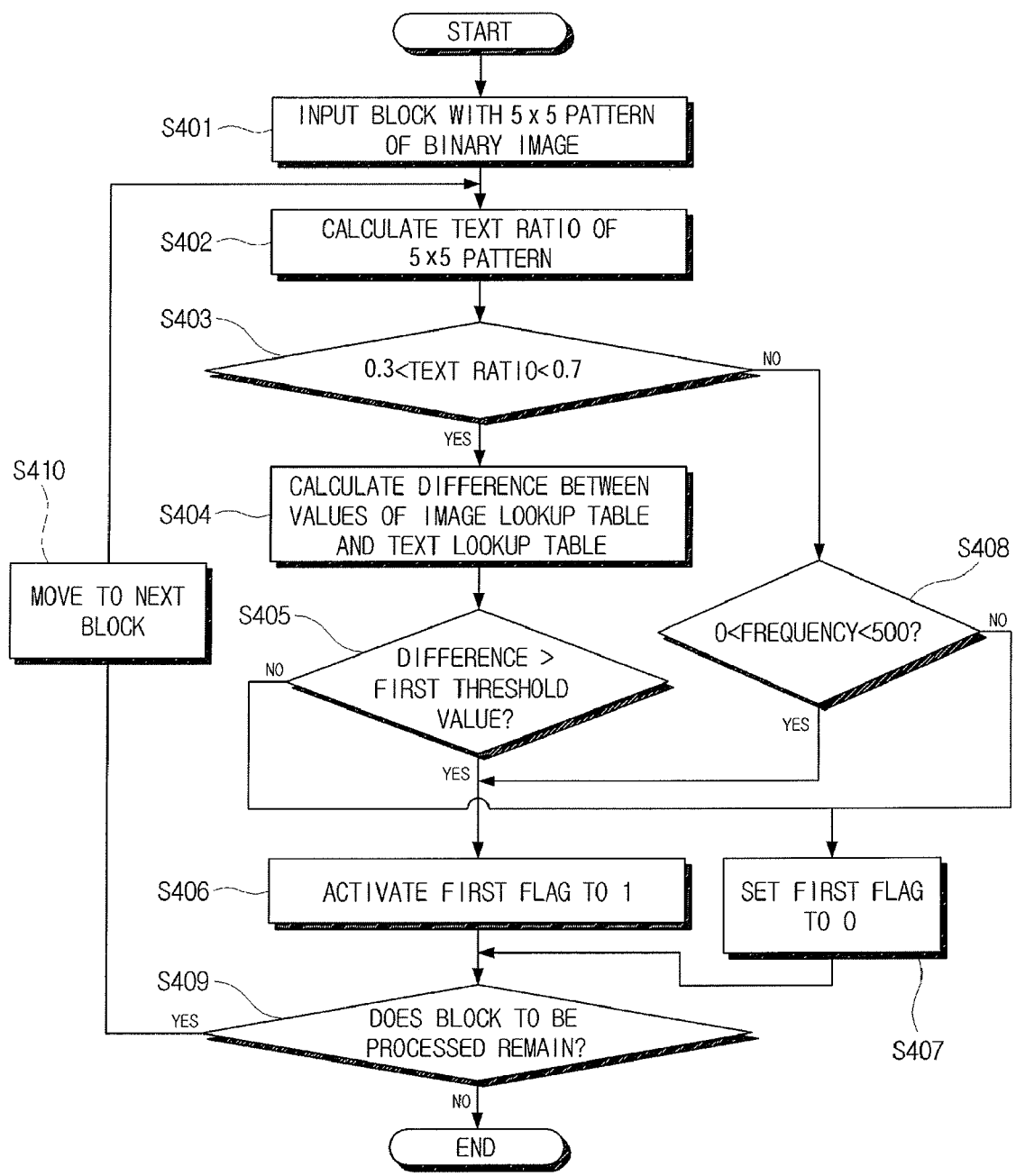
FIGS. 13A and 13B are flow charts illustrating a process of generating a flag used as a condition in a test process.
Figure 13B:
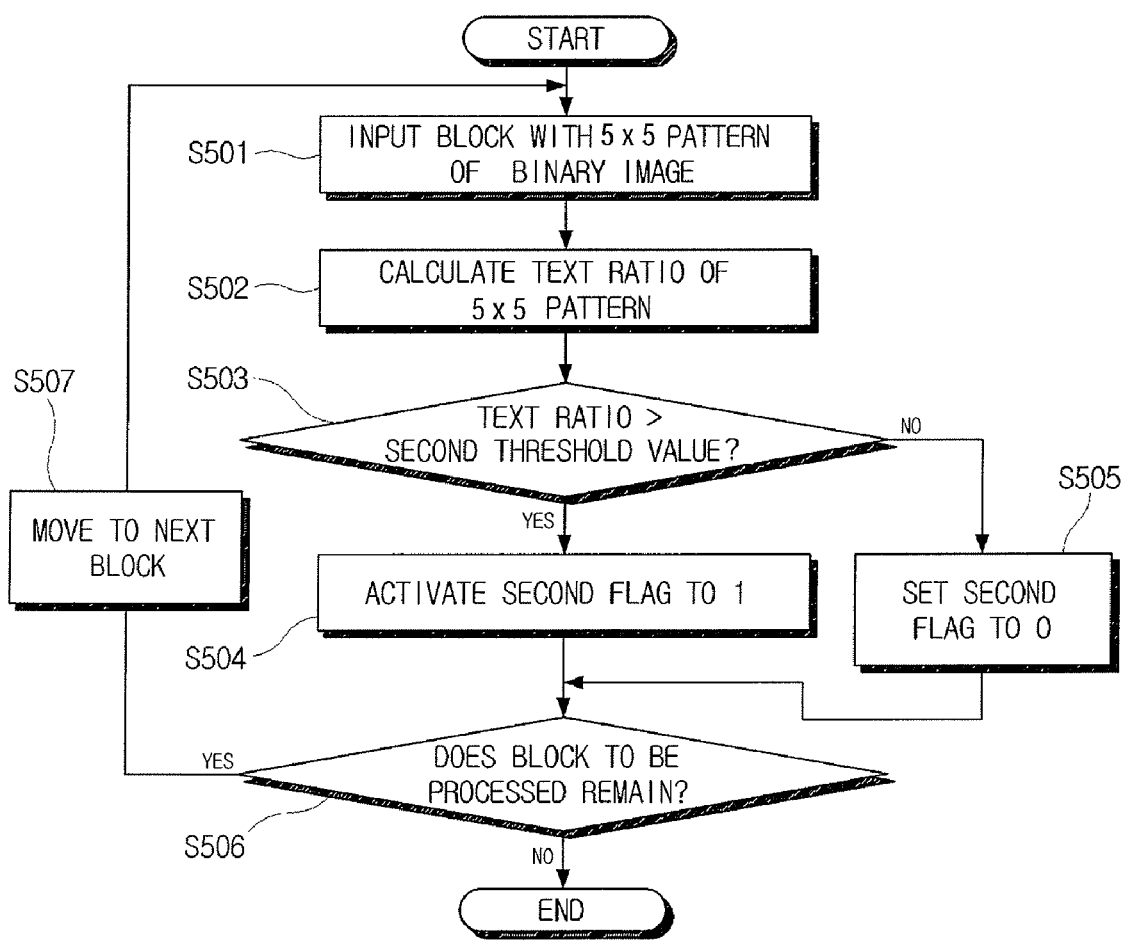

FIGS. 13A and 13B are flow charts illustrating an exemplary process of establishing which lookup table to access to retrieve the gray level value. In the exemplary test process illustrated in FIGS. 13A and 13B, one-bit data are stored in a first flag and a second flag corresponding to image blocks being scrutinized. The first flag maintains an indicator as to which of the three generated hybrid lookup tables (the image lookup table imageLUT, the text lookup table textLUT, and the overall lookup table LUT) is to be accessed to retrieve the gray level value. The second flag maintains an indicator as to which of the image lookup table imageLUT and the text lookup table textLUT is to be accessed for the gray level.

FIG. 13A is a flow chart illustrating a method of determining the state of the first flag. In the present exemplary embodiment, it is to be assumed that the template is optimized to a 5×5 block, such as by the template optimization processes described above, and lookup tables have been populated with patterns corresponding to the optimized template having, for example, 16 member pixels, such as by the training procedures described above. Then, as illustrated in FIG. 13A, an input block of 5×5 pixels of the overall training binary image is provided to operation S401 and is analyzed to obtain its pixel pattern of member pixels in the template. A "text ratio" of the 5×5 pattern of the block is calculated at operation S402. As used herein, the "text ratio" refers to a ratio of the frequency at which a pattern to be processed occurs in the overall training image to the frequency at which the pattern to be processed occurs in the training image containing the high frequency components, e.g., the textLUT. The text ratio may be expressed by the following equation 7.

$$Textratio = \frac{frequency_{total}[P]}{frequency_{text}[P]} \quad \text{[Equation 7]}$$

Here, P represents the pattern of template member pixels in the 5×5 block to be processed, $frequency_{total}[P]$ represents frequency at which the pattern P occurs in the overall training image, $frequency_{text}[P]$ represents frequency at which the pattern P occurs in the training image containing the high frequency components, such as text. The frequency of occurrence of the pattern P in an image is not to be confused with spatial frequency, but rather is a rate of recurrence of the pattern P in the image. Such rate may be expressed as a number of occurrences in the image or in respective blocks thereof.

Next, it is determined at operation S403 whether the calculated text ratio of the block to be processed falls within a range of 0.3 to 0.7. If it is determined at operation S403 that the text ratio falls within a range of 0.3 to 0.7, a difference |diff| between the gray levels in the image lookup table imageLUT and the text lookup table textLUT corresponding to the pattern P is calculated at operation S404, and it is determined at operation S405 whether the difference |diff| is greater than a first threshold value. If it is determined at operation S405 that the difference |diff| is greater than the first threshold value, the first flag (first flag [P]) corresponding to the pattern P is set, such as by activation into a "1" state, at operation S406. If it is determined at operation S405 that the difference |diff| is not greater than the first threshold value, the first flag (first flag [P]) is reset, such as by activation into a "0" state, at operation S407. In accordance with the present exemplary embodiment, the first threshold value is set to be 0.3 obtained through visual estimation of a resultant image according to the hybrid resolution improving method.

On the other hand, if it is determined at operation S403 that the text ratio of the pattern P to be processed does not fall within a range of 0.3 to 0.7, it is determined at operation S408 whether the frequency at which the pattern P to be processed occurs in the overall training image is larger than 0 and less than a predetermined upper bound, for example, 500. If it is determined at operation S408 that the frequency of occurrence in the overall training image of the pattern P is larger than 0 and less than 500, the first flag (first flag [P]) is set at operation S406. On the other hand, if it is determined that such frequency of occurrence is greater than the upper bound, e.g., 500, the first flag (first flag [P]) is reset at operation S407.

Next, after the operation S406 or S407, it is determined whether a block remains to be processed at operation S409. If it is determined at operation S409 that a block remains to be processed, the process proceeds to operation S410 to repeat the operations S402 to S409.

FIG. 13B is a flow chart illustrating a process of determining the state of the second flag. As illustrated in FIG. 13B, a 5×5 block of the overall training binary image is provided to operation S501 and the text ratio of the 5*5 pattern is calculated at operation S502. It is then determined at operation S503 whether the calculated text ratio is greater than a second threshold value. If it is determined at operation S503 that the text ratio is greater than the second threshold value, the second flag (second flag [P]) of the pattern P to be processed is set at operation S504, such as by activation into a "1" state. If it is determined at operation S503 that the text ratio is not greater than the second threshold value, the second flag (second flag [P]) is reset, such as by activation into a "0" state, at operation S505. In this exemplary embodiment, the second threshold value is set to be 0.6 as determined through visual estimation of a resultant image according to the hybrid resolution improving method.

After the operation S504 or S505, it is determined at operation S506 whether there is a block remaining to be processed. If it is determined at operation S506 that a block remains to be processed, the process proceeds to operation S507 to repeat the operations S502 to S506.

Figure 14:
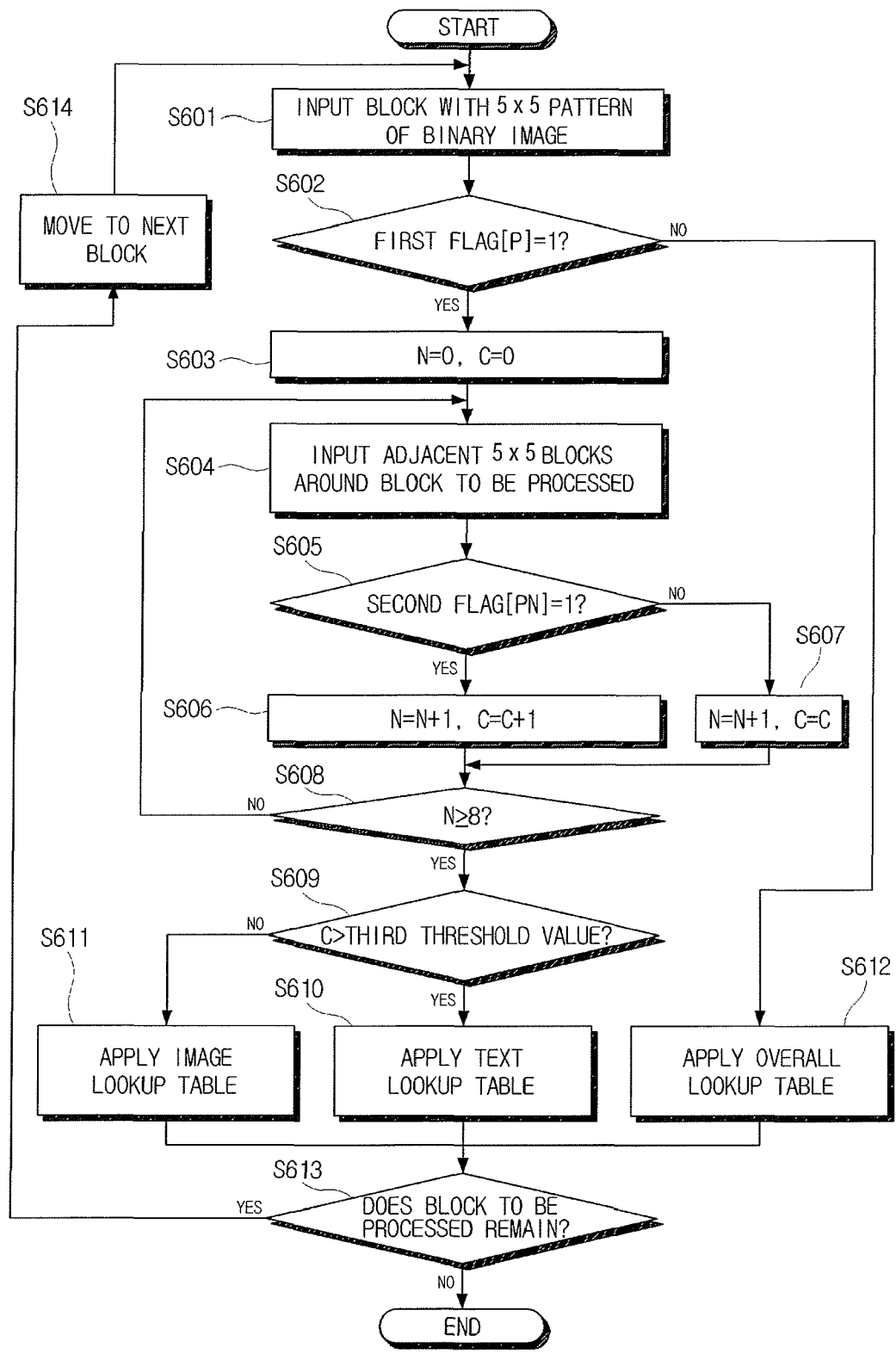
FIG. 14 is a flow chart illustrating a process of applying a hybrid lookup table to a block of a test image.

FIG. 14 is a flow chart illustrating an exemplary process through which a hybrid lookup table is accessed to process a block of the image to be processed in accordance with embodiments of the present general inventive concept. In this exemplary embodiment, the test image is a 600 dpi binary image, the size of the image processing block is 5×5 pixels, and the number of member pixels in the template is 16.

As illustrated in FIG. 14, a 5×5 block of the 600 dpi binary image is provided to operation S601 and is evaluated as to its pattern of member pixels of the template. It is then determined at operation S602 whether the first flag (first flag [P]) corresponding to the input pattern P is set. If it is determined at operation S602 that the first flag (first flag [P]) is activated into a "1" state, one of the image lookup table imageLUT or the text lookup table textLUT is accessed at operations S603 to S611. On the other hand, if it is determined at operation S602 that the first flag (first flag [P]) is reset, the gray level value for the pattern is obtained from the overall lookup table LUT at operation S612.

Figure 15:
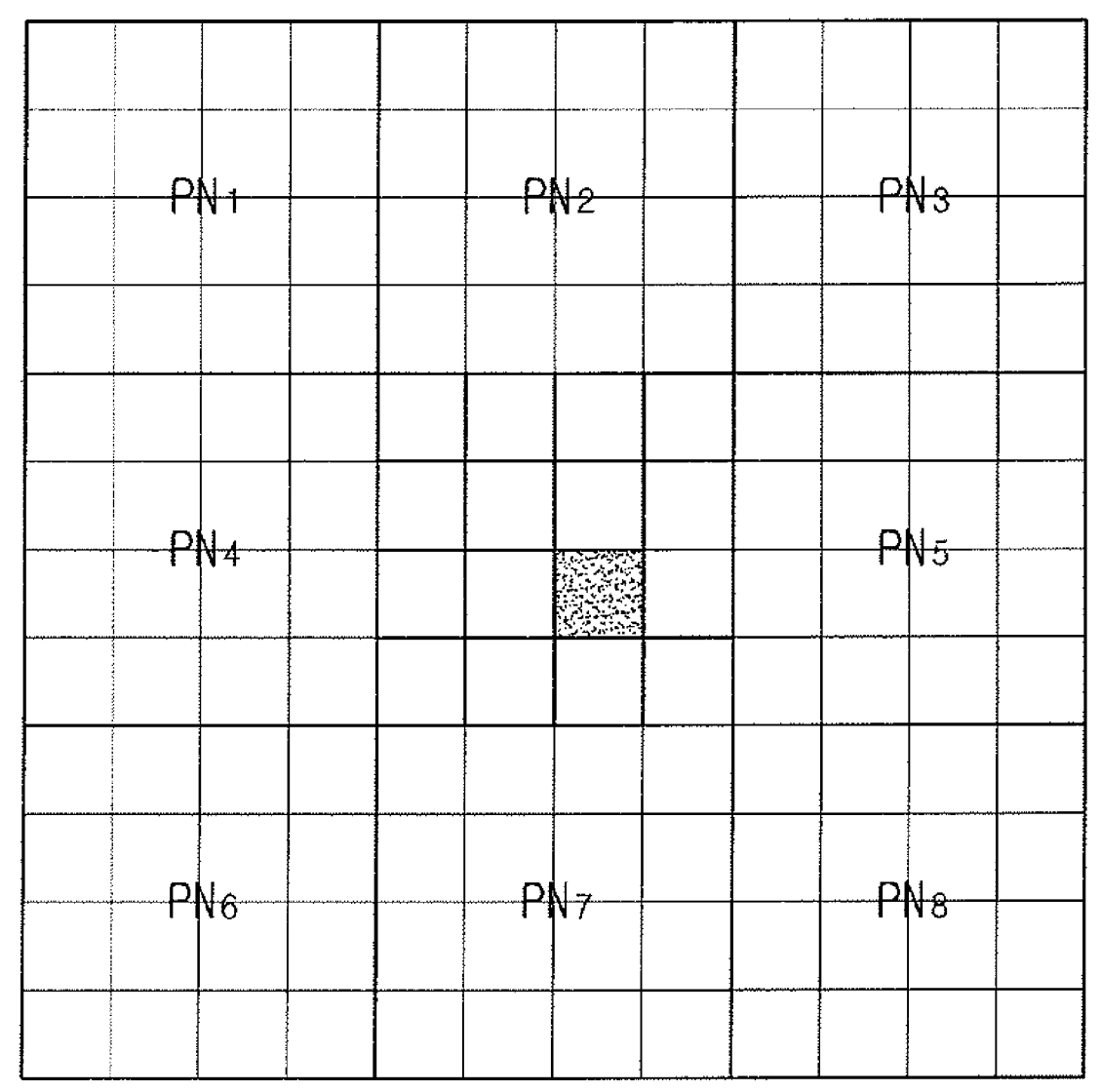

If it is determined at operation S602 that the first flag (first flag [P]) is set, the counters N and C are initialized to zero at operation S603, where N maintains a number of 5×5 blocks around the block containing pattern P that have been evaluated for the state of respective second flags thereof, as will be described below and C maintains the number of adjacent 5×5 blocks PN having an activated second flag (second flag [PN]). Here, C is a value between 1 and 8. FIG. 15 is a view depicting eight adjacent blocks PN around a block P that contains the pattern to be processed.

Next, the adjacent blocks PN are respectively provided to operation S604, and each is evaluated at operation S605 as to whether the second flag (second flag [PN]) thereof is set. If it is determined at operation S605 that the second flag (second flag [PN]) is set, C and N are incremented by one at operation S606. On the other hand, if it is determined at operation S605 that the second flag (second flag [PN]) of the adjacent block PN is reset, N is incremented by one and C remains unchanged at operation S607.

Next, it is determined at operation S608 whether N has been incremented to be equal to the number of adjacent blocks, which is eight (8) in the illustrated embodiment. If it is determined at operation S608 that N does not equal 8, the operations S604 to S608 are repeated. That is, it is determined whether the second flags corresponding to all of the eight adjacent blocks PN around the block P to be processed are set.

If it is determined at operation S608 that N equals 8, it is then determined at operation S609 whether C is greater than a third threshold value. If it is determined at operation S609 that C is larger than the third threshold value, the gray level value corresponding to the pattern P is obtained from the text lookup table textLUT at operation S610. In other words, if the number of the eight adjacent blocks PN around the block P to be processed having a text ratio greater than the second threshold value is greater than the third threshold value, the text lookup table textLUT is accessed to obtain the gray level value corresponding to the pattern to be processed. In certain embodiments of the present general inventive concept, the third threshold value is set to 0 as obtained through visual estimation of a resultant image according to the hybrid resolution improving method.

On the other hand, if it is determined at operation S609 that C is less than the third threshold value, the gray level value for the pattern P is retrieved from the image lookup table at operation S611.

After the operation S610, S611 or S612, it is determined at operation S613 whether a block remains to be processed at operation S613. If it is determined at operation S613 that a block remains to be processed, the process proceeds to operation S614 to repeat the operations S601 to S613. As described above, the lookup table from which the gray level value is retrieved is determined from values of the first and second flags, the states of which are indicative of the characteristics of the image context.

Figure 16A:
FIG. 16A is a view illustrating an example of a result of application of one lookup table to a test image in the related art.
Figure 16B:
FIG. 16B is a view illustrating an example of a result obtained according to an exemplary embodiment of the present general inventive concept.

FIG. 16A is a view illustrating an example of a result of application of one lookup table to a test image in the related art, and FIG. 16B is a view illustrating an example of a result obtained according to an exemplary embodiment of the present general inventive concept. It can be readily observed from FIGS. 16A and 16B that artifacts such as blurring are greatly decreased by way of application of the present general inventive concept. Accordingly, increase of information quantity and expansion of the size of print data after print data transmission can be achieved simultaneously, and when implemented in accordance with the exemplary embodiment described above, print data reduced by $\frac{1}{32}$ can be transmitted and received into a lower capacity page memory.

Figure 17:
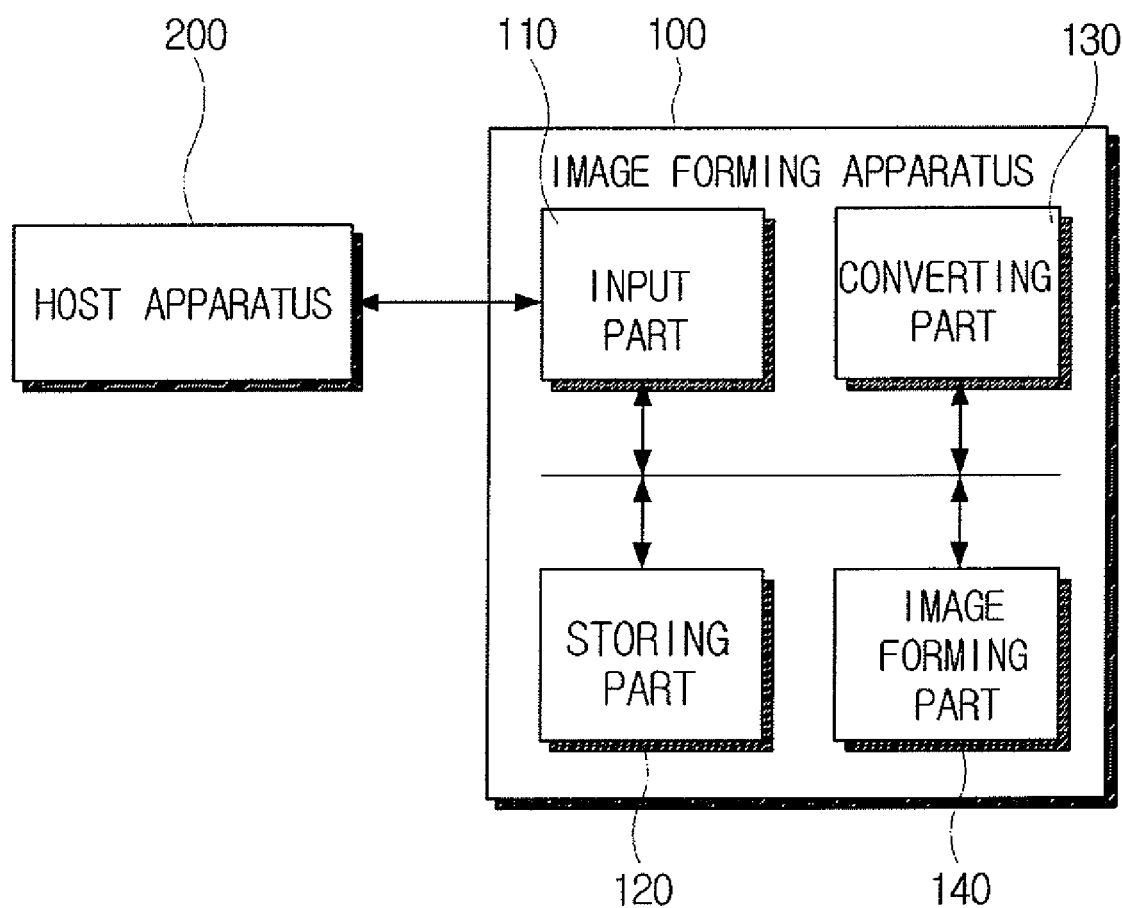
FIG. 17 is a block diagram illustrating a configuration of an image forming apparatus according to an exemplary embodiment of the present general inventive concept.

FIG. 17 is a schematic block diagram illustrating a configuration of an image forming apparatus 100 according to an exemplary embodiment of the general inventive concept. The image forming apparatus 100 may perform a printing operation to a print medium such as a paper, based on print data transmitted from a host apparatus 200. The image forming apparatus 100 may be, for example, a printer, a multifunction copier, or the like. The host apparatus 200 may be, for example, a computer system.

As illustrated in FIG. 17, the image forming apparatus 100 comprises an input part 110, a storing part 120, a converting part 130 and an image forming part 140. The input part 110 communicates with the host apparatus 200 and receives print data of a binary image from the host apparatus 200. It is to be understood that the compartmentalization of the functionality illustrated through the components of FIG. 17 is suited to describe the features of the present general inventive concept, but other configurations may be used with the present general inventive concept without departing from the spirit and intended scope thereof. For example, certain functionality of components illustrated in FIG. 17 as discrete can be combined into a single component, whereas others may be distributed across multiple components. Moreover, any of the components may be implemented in hardware, software or a combination of both. Other variants may become apparent to the skilled artisan upon review of this disclosure, and the present general inventive concept is intended to embrace all such variants.

The storing part 120 stores a plurality of lookup tables such as those described above having gray level values corresponding to patterns of the binary image. The storing part 120 may further include processing instructions to be executed by a processor so as to carry out one or more features of the present general inventive concept.

The converting part 130 converts an input binary image into a grayscale image by retrieving a gray level value from one of the plurality of lookup tables stored in the storing part 120 that corresponds to the applicable characteristic of the image context, such as the frequency content thereof. The converting part 130 may perform embodiments of the image processing method of the present general inventive concept as exemplified above with reference to FIGS. 12 to 15 through interconnected circuit elements, through implementation of a processor executing processing instructions, or a combination of both.

The image forming part 140 performs a printing operation on a print medium based on the grayscale image generated in the converting part 130. The present general inventive concept is not limited by the system configuration of the image forming part 140 and many such devices may be used in conjunction with the present invention, including ink-based devices and toner-based devices.

As apparent from the above description, the present general inventive concept provides an image processing method and an image processing apparatus, which are capable of increasing the resolution of an image using a plurality of lookup tables.

Specifically, a resultant image without artifacts such as blurring or a mosaic pattern can be obtained by implementing a hybrid lookup table including a separate gray level value for a context dependent pixel pattern, such as was demonstrated through the image lookup table, the text lookup table, and the overall lookup table described above.

Accordingly, since the size and information quantity of an image can be reduced, it is possible to prevent deterioration of image quality when the image is restored, thereby performing a printing operation at a higher speed.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image processing method of converting a binary image into a grayscale image, comprising:
   generating a plurality of lookup tables having gray level values assigned to a predetermined pattern of the binary image such that the plurality of lookup tables corresponds to frequency components of the binary image, wherein the plurality of lookup tables includes an image lookup table corresponding to an image having a low frequency component and a text lookup table corresponding to an image having a high frequency component; and
   converting the binary image into the grayscale image by retrieving a gray level value from one of the plurality of lookup tables that corresponds to one of the frequency components of the binary image, wherein the converting the binary image into the grayscale image includes retrieving the gray level value from one of the image lookup table or the text lookup table according to a text ratio of the binary image, the text ratio being a ratio of a frequency at which a pattern to be processed occurs in an overall training image to a frequency at which the pattern to be processed occurs in a training image having the high frequency component.

2. The image processing method according to claim 1, wherein at least one of the image lookup table and the text lookup table is determined using a pattern existing in the binary image and a mean value of a plurality of gray level values corresponding to the pattern in the grayscale image.

3. The image processing method according to claim 1, wherein the plurality of lookup tables further comprises an overall lookup table corresponding to the overall training image, and wherein the converting the binary image into the grayscale image comprises retrieving the gray level value from the image lookup table or the text lookup table if the text ratio of the pattern to be processed falls within a first range and a difference between values of the image lookup table and the text lookup table is larger than a first threshold value.

4. The image processing method according to claim 1, wherein the plurality of lookup tables further comprises an overall lookup table corresponding to the overall training image, and
   wherein the converting the binary image into the grayscale image comprises retrieving the gray level value from the image lookup table or the text lookup table if the text ratio of the pattern to be processed is out of a first range and a frequency at which the pattern to be processed occurs in the overall training image falls within a second range.

5. The image processing method according to claim 4, wherein the converting the binary image into the grayscale image comprises retrieving the gray level value from the text lookup table if a number of blocks adjacent to a block having the pattern to be processed and having the text ratio larger than a second threshold value is larger than a third threshold value.

6. The image processing method according to claim 1, wherein the generating the plurality of lookup tables comprises determining an optimized template using a genetic algorithm.

7. An image processing apparatus to convert a binary image into a grayscale image, comprising:
   a storing part that stores a plurality of lookup tables having gray level values assigned to a predetermined pattern of the binary image such that the plurality of lookup tables corresponds to frequency components of the binary image, wherein the plurality of lookup tables includes an image lookup table corresponding to an image having a low frequency component and a text lookup table corresponding to an image having a high frequency component; and
   a converting part that converts the binary image into the grayscale image by retrieving a gray level value from one of the plurality of lookup tables that corresponds to one of the frequency components of the binary image, wherein the converting the binary image into the grayscale image includes retrieving the gray level value from one of the image lookup table or the text lookup table according to a text ratio of the binary image, the text ratio being a ratio of a frequency at which a pattern to be processed occurs in an overall training image to a frequency at which the pattern to be processed occurs in a training image having the high frequency component.

8. A method to convert a binary image into a multi-bit pixel image, the method comprising:
- storing in a memory table a first multi-bit pixel value and a second multi-bit pixel value each addressed by a like bit pattern formed from states of binary image pixels;
- assigning to a pixel in the multi-bit pixel image one of the first multi-bit pixel value and the second multi-bit pixel value addressed by the bit pattern corresponding to the states of the binary image pixels in an image block of the binary image containing a binary pixel corresponding to the pixel in the multi-bit pixel image, the first multi-bit pixel value being assigned to the pixel when the image block in the binary image is in a first image context and the second multi-bit pixel value being assigned to the pixel when the image block in the binary image is in a second image context; and
- determining an optimum template of locations in the image block from which to obtain the states of the binary image pixels, the determining of the optimum template including selecting the template from a population thereof generated by an evolutionary process, wherein
- the selected template is optimal among the population thereof based on a predetermined fitness measure; and
- the predetermined fitness measure is a correlation coefficient calculated between the image block of the binary image and an image block of a restored binary image.

9. The method according to claim 8 further comprising:
- determining the first image context and the second image context from spatial frequency content of the binary image.

10. A method to convert a binary image obtained from an image having a first resolution to a multi-bit pixel image having a second resolution, the method comprising:
- forming a hybrid lookup table having a plurality of storage locations respectively addressable by a plurality of bit patterns, at least two of the storage locations being addressed by a like one of the bit patterns;
- storing in each of the storage locations of the hybrid lookup table a multi-bit pixel value obtained from a multi-bit training image at a pixel location corresponding to a binary pixel in an image block of a binary training image, the multi-bit training image having the second resolution, the bit pattern to address each of the storage locations being formed from states of a plurality of binary pixels in the image block of the binary training image, the at least two of the storage locations storing a first multi-bit pixel value and a second multi-bit pixel value;
- assigning to a pixel in the multi-bit pixel image the first multi-bit pixel value when the image block in the binary image having pixel states corresponding to the like bit pattern is in a first image context and assigning the second multi-bit pixel value when the image block in the binary image having the pixel states corresponding to the like bit pattern is in a second image context; and
- determining an optimum template of locations in the image block from which to obtain the states of the plurality of binary pixels in the image block, the determining of the optimum template including selecting the template from a population thereof generated by an evolutionary process, wherein
- the selected template is optimal among the population thereof based on a predetermined fitness measure; and
- the predetermined fitness measure is a correlation coefficient calculated between the image block of the binary training image and an image block of a restored binary image.

11. The method according to claim 10 further comprising:
- forming the multi-bit training image from a second multi-bit training image having the first resolution.

12. The method according to claim 11, whereby forming the multi-bit training image includes generating a pixel value in the first training image from a pixel in the first image context of the second training image and generating another pixel value in the first training image from a pixel in the second image context of the second training image.

13. The method according to claim 11, whereby forming the multi-bit training image includes interpolating the second multi-bit training image.

14. The method according to claim 10 further comprising:
- determining the first image context and the second image context from spatial frequency content of the binary image.

15. An apparatus to convert a binary image into a multi-bit pixel image, comprising:
- a storing part to store a first multi-bit pixel value and a second multi-bit pixel value each addressed by a like bit pattern formed from states of binary image pixels;
- a converting part to assign to a pixel in the multi-bit pixel image one of the first multi-bit pixel value and the second multi-bit pixel value addressed by the like bit pattern corresponding to the states of the binary image pixels in an image block of the binary image containing a binary pixel corresponding to the pixel in the multi-bit pixel image, the converting part to assign the first multi-bit pixel value to the pixel when the image block in the binary image is in a first image context and to assign the second multi-bit pixel value to the pixel when the image block in the binary image is in a second image context; and
- determining an optimum template of locations in the image block from which to obtain the states of the binary image pixels, the determining of the optimum template including selecting the template from a population thereof generated by an evolutionary process, wherein
- the selected template is optimal among the population thereof based on a predetermined fitness measure; and
- the predetermined fitness measure is a correlation coefficient calculated between the image block of the binary image and an image block of a restored binary image.

16. The apparatus according to claim 15, further comprising an input part to receive the binary image at a resolution less than the multi-bit pixel image.

* * * * *